United States Patent
Hammer et al.

(10) Patent No.: US 11,945,705 B2
(45) Date of Patent: Apr. 2, 2024

(54) SYSTEM AND METHOD FOR CONTROLLING A MAXIMUM VEHICLE SPEED FOR AN INDUSTRIAL VEHICLE BASED ON A CALCULATED LOAD

(71) Applicant: Crown Equipment Corporation, New Bremen, OH (US)

(72) Inventors: Joe K. Hammer, St. Marys, OH (US); Mark E. Addison, Ludlow Falls, OH (US)

(73) Assignee: Crown Equipment Corporation, New Bremen, OH (US)

( * ) Notice: Subject to any disclaimer, the term of this patent is extended or adjusted under 35 U.S.C. 154(b) by 0 days.

(21) Appl. No.: 17/456,231

(22) Filed: Nov. 23, 2021

(65) Prior Publication Data
US 2022/0081270 A1    Mar. 17, 2022

Related U.S. Application Data

(63) Continuation of application No. 16/562,715, filed on Sep. 6, 2019, now Pat. No. 11,352,243.
(Continued)

(51) Int. Cl.
*B66F 9/075*    (2006.01)
*B60W 40/105*    (2012.01)
(Continued)

(52) U.S. Cl.
CPC ....... *B66F 9/07559* (2013.01); *B60W 40/105* (2013.01); *B60W 40/13* (2013.01);
(Continued)

(58) Field of Classification Search
CPC . B66F 9/07559; B60W 40/105; B60W 40/13; B60W 50/12; B60W 2300/121; B60W 2530/10
See application file for complete search history.

(56) References Cited

U.S. PATENT DOCUMENTS

| | | |
|---|---|---|
| 4,531,300 A | 7/1985 | Heidel et al. |
| 4,766,547 A | 8/1988 | Modery et al. |

(Continued)

FOREIGN PATENT DOCUMENTS

| | | |
|---|---|---|
| CN | 101526421 A | 9/2009 |
| CN | 101844559 A | 9/2010 |

(Continued)

OTHER PUBLICATIONS

US 10,023,202 B2, 07/2018, Mangette et al. (withdrawn)
(Continued)

*Primary Examiner* — Jaime Figueroa
*Assistant Examiner* — Mohamad O El Sayah
(74) *Attorney, Agent, or Firm* — Stevens & Showalter LLP

(57) ABSTRACT

Controlling a maximum vehicle speed for an industrial vehicle includes determining, by a processor of the industrial vehicle, a torque applied to the traction wheel of the industrial vehicle; converting the torque to an equivalent force value; and determining an acceleration of the industrial vehicle while the torque is applied to the traction wheel. Additional steps include calculating a load being moved by the industrial vehicle, based at least in part on the acceleration and the equivalent force value; and controlling the maximum speed of the industrial vehicle based on the calculated load being moved by the industrial vehicle.

2 Claims, 10 Drawing Sheets

Related U.S. Application Data

(60) Provisional application No. 62/730,810, filed on Sep. 13, 2018.

(51) Int. Cl.
  B60W 40/13 (2012.01)
  B60W 50/12 (2012.01)

(52) U.S. Cl.
  CPC ....... B60W 50/12 (2013.01); *B60W 2300/121* (2013.01); *B60W 2530/10* (2013.01)

(56) References Cited

U.S. PATENT DOCUMENTS

| | | |
|---|---|---|
| 5,070,959 A | 12/1991 | Grabowski |
| 6,135,694 A | 10/2000 | Trego et al. |
| 6,236,927 B1 | 5/2001 | Sherman |
| 6,425,728 B1 | 7/2002 | Goto |
| 6,527,076 B1 | 3/2003 | Polzin |
| 6,782,961 B1 | 8/2004 | Ishikawa et al. |
| 6,945,745 B2 | 9/2005 | Retzlaff |
| 7,034,476 B2 | 4/2006 | Wang et al. |
| 7,120,532 B2 | 10/2006 | Persson et al. |
| 7,165,819 B2 | 1/2007 | Yokoyama |
| 7,216,024 B1 | 5/2007 | Abels et al. |
| 7,308,352 B2 | 12/2007 | Wang et al. |
| 7,322,444 B2 | 1/2008 | Allerding et al. |
| 7,460,941 B2 | 12/2008 | Sychra et al. |
| 7,568,547 B2 | 8/2009 | Yamada et al. |
| 7,735,609 B2 | 6/2010 | Ito et al. |
| 7,762,633 B2 | 7/2010 | Maskell et al. |
| 7,822,513 B2 | 10/2010 | Wulff |
| 7,874,152 B2 | 1/2011 | Pfaff |
| 8,131,422 B2 | 3/2012 | Jensen et al. |
| 8,140,228 B2 | 3/2012 | Mccabe et al. |
| 8,210,991 B2 | 7/2012 | Yuet et al. |
| 8,321,085 B2 | 11/2012 | Saito |
| 8,412,447 B2 | 4/2013 | Hecker et al. |
| 8,510,011 B2 | 8/2013 | Inoue et al. |
| 8,589,045 B2 | 11/2013 | Seymour et al. |
| 8,649,953 B2 | 2/2014 | Sherman |
| 8,655,569 B2 | 2/2014 | Choby |
| 8,714,311 B2 | 5/2014 | Billger et al. |
| 8,793,002 B2 | 7/2014 | Anderson et al. |
| 8,948,982 B2 | 2/2015 | Elliott |
| 9,002,557 B2 | 4/2015 | Goncalves et al. |
| 9,045,045 B2 | 6/2015 | Onodera et al. |
| 9,358,975 B1 | 6/2016 | Watts |
| 9,533,864 B2 | 1/2017 | Peterson |
| 9,561,794 B2 | 2/2017 | Watts |
| 9,726,102 B2 | 8/2017 | Woo |
| 10,081,367 B2 | 7/2018 | Mangette et al. |
| 10,940,862 B1 | 3/2021 | Dempsey et al. |
| 10,948,064 B2 | 3/2021 | Öberg et al. |
| 2001/0001138 A1 | 5/2001 | Zhu et al. |
| 2001/0054954 A1 | 12/2001 | Matsumoto et al. |
| 2003/0088354 A1 | 5/2003 | Persson et al. |
| 2003/0154798 A1 | 8/2003 | Weyand et al. |
| 2004/0068359 A1 | 4/2004 | Neiss et al. |
| 2005/0187671 A1 | 8/2005 | Nada |
| 2008/0039990 A1 | 2/2008 | Stevens et al. |
| 2009/0057065 A1 | 3/2009 | Akaki et al. |
| 2009/0152052 A1 | 6/2009 | Schoettke |
| 2010/0063682 A1 | 3/2010 | Akaki |
| 2010/0114415 A1 | 5/2010 | Arnsby |
| 2010/0198492 A1 | 8/2010 | Watanabe |
| 2010/0204891 A1 | 8/2010 | Biggerstaff |
| 2010/0228428 A1 | 9/2010 | Harshbarger et al. |
| 2010/0250073 A1 | 9/2010 | Mccabe et al. |
| 2011/0282558 A1 | 11/2011 | Park |
| 2014/0067155 A1 | 3/2014 | Yu et al. |
| 2014/0188324 A1 | 7/2014 | Waltz et al. |
| 2014/0244120 A1* | 8/2014 | Fujii ............ B60W 10/11 701/58 |
| 2014/0297147 A1 | 10/2014 | Newman |
| 2015/0039164 A1 | 2/2015 | Onodera et al. |
| 2016/0084275 A1 | 3/2016 | Kaneko et al. |
| 2017/0043765 A1 | 2/2017 | Mangette et al. |
| 2017/0043787 A1 | 2/2017 | Mangette et al. |
| 2017/0057798 A1 | 3/2017 | Dues et al. |
| 2017/0327094 A1 | 11/2017 | Inoue et al. |
| 2018/0141752 A1 | 5/2018 | Nakanishi et al. |
| 2018/0162394 A1 | 6/2018 | Kamiya |
| 2018/0170396 A1 | 6/2018 | Burnette |
| 2018/0229988 A1 | 8/2018 | Gault et al. |
| 2019/0001980 A1 | 1/2019 | David et al. |
| 2019/0039595 A1* | 2/2019 | Hawley ............ B60L 15/2018 |
| 2019/0135293 A1 | 5/2019 | Kotteri et al. |
| 2020/0087127 A1 | 3/2020 | Hammer et al. |
| 2021/0004004 A1 | 1/2021 | Whitfield, Jr. et al. |

FOREIGN PATENT DOCUMENTS

| | | |
|---|---|---|
| CN | 102320245 A | 1/2012 |
| CN | 102753416 A | 10/2012 |
| CN | 103459213 A | 12/2013 |
| CN | 103661395 A | 3/2014 |
| CN | 105705389 A | 6/2016 |
| CN | 106476625 A | 3/2017 |
| CN | 108140160 A | 6/2018 |
| CN | 109516420 A | 3/2019 |
| CN | 112092812 A | 12/2020 |
| DE | 2336753 A1 | 2/1975 |
| DE | 10232639 A1 | 2/2004 |
| DE | 10304658 A1 | 8/2004 |
| DE | 10355933 A1 | 6/2005 |
| DE | 10355934 A1 | 6/2005 |
| DE | 102005012004 A1 | 10/2005 |
| DE | 102006048437 A1 | 4/2008 |
| DE | 102009022170 A1 | 1/2010 |
| DE | 102011012315 A1 | 6/2012 |
| DE | 102011006386 A1 | 10/2012 |
| DE | 102011053961 A1 | 3/2013 |
| DE | 102013216649 A1 | 3/2014 |
| DE | 102014200557 A1 | 7/2015 |
| DE | 102014119460 A1 | 6/2016 |
| DE | 102015104069 A1 | 9/2016 |
| DE | 102015115825 A1 | 1/2017 |
| DE | 102017011302 A1 | 8/2018 |
| DE | 102017124435 A1 | 4/2019 |
| DE | 102019004523 A1 | 1/2020 |
| DE | 102019114379 A1 | 3/2020 |
| EP | 343839 A2 | 11/1989 |
| EP | 1190885 A2 | 3/2002 |
| EP | 1278668 A1 | 1/2003 |
| EP | 1302357 A1 | 4/2003 |
| EP | 1447376 A1 | 8/2004 |
| EP | 1557331 A1 | 7/2005 |
| EP | 1655211 A2 | 5/2006 |
| EP | 1700767 A2 | 9/2006 |
| EP | 1746069 A1 | 1/2007 |
| EP | 1758811 A1 | 3/2007 |
| EP | 1953838 A2 | 8/2008 |
| EP | 2094599 A1 | 9/2009 |
| EP | 2172359 A1 | 4/2010 |
| EP | 2233427 A1 | 9/2010 |
| EP | 2308730 A1 | 4/2011 |
| EP | 2338721 A2 | 6/2011 |
| EP | 2378383 A2 | 10/2011 |
| EP | 2409887 A2 | 1/2012 |
| EP | 2433831 A2 | 3/2012 |
| EP | 2492162 A2 | 8/2012 |
| EP | 2492164 A2 | 8/2012 |
| EP | 2492173 A2 | 8/2012 |
| EP | 2674387 A1 | 12/2013 |
| EP | 2848498 A1 | 3/2015 |
| EP | 2872370 A1 | 5/2015 |
| EP | 2982944 A1 | 2/2016 |
| EP | 3070046 A1 | 9/2016 |
| EP | 3078623 A1 | 10/2016 |
| EP | 3090979 A1 | 11/2016 |

(56) References Cited

FOREIGN PATENT DOCUMENTS

| | | |
|---|---|---|
| EP | 3115332 A1 | 1/2017 |
| EP | 3165885 A1 | 5/2017 |
| EP | 3214035 A1 | 9/2017 |
| EP | 3422839 A1 | 1/2019 |
| EP | 3504602 A1 | 7/2019 |
| EP | 3684162 A1 | 7/2020 |
| EP | 3689698 A1 | 8/2020 |
| GB | 2413547 A | 11/2005 |
| GE | P20053559 B | 6/2005 |
| JP | 63269733 A | 11/1988 |
| JP | H01148630 A | 6/1989 |
| JP | H0266368 A | 3/1990 |
| JP | H06135260 A | 5/1994 |
| JP | 2674833 B2 | 11/1997 |
| JP | 10175800 A | 6/1998 |
| JP | H10238621 A | 9/1998 |
| JP | 2000062494 A | 2/2000 |
| JP | 2001163199 A | 6/2001 |
| JP | 2001240213 A | 9/2001 |
| JP | 2002262411 A | 9/2002 |
| JP | 2002340182 A | 11/2002 |
| JP | 2003328803 A | 11/2003 |
| JP | 2003335230 A | 11/2003 |
| JP | 2005096508 A | 4/2005 |
| JP | 2005214060 A | 8/2005 |
| JP | 2005297900 A | 10/2005 |
| JP | 2005323431 A | 11/2005 |
| JP | 2006226178 A | 8/2006 |
| JP | 2007132316 A | 5/2007 |
| JP | 2008101680 A | 5/2008 |
| JP | 2008265602 A | 11/2008 |
| JP | 2010221917 A | 10/2010 |
| KR | 20100058187 A | 6/2010 |
| WO | 2004009396 A1 | 1/2004 |
| WO | 2011063823 A1 | 6/2011 |
| WO | 2014126523 A1 | 8/2014 |
| WO | 2017027404 A1 | 2/2017 |
| WO | 2017214678 A1 | 12/2017 |
| WO | 2018072712 A1 | 4/2018 |
| WO | 2021024838 A1 | 2/2021 |

OTHER PUBLICATIONS

Machine translation of DE102014200557 (Year: 2015).*

Notification of the Second Office Action dated Jun. 21, 2022; Chinese Application No. 201980057542.3; China National Intellectual Property Administration; Beijing, China.

V. Winstead and I. V. Kolmanovsky, "Estimation of road grade and vehicle mass via model predictive control," Proceedings of 2005 IEEE Conference on Control Applications, 2005. CCA 2005., 2005, pp. 1588-1593, doi: 10.1109/CCA.2005.1507359.

Tejas, Ghotikar; "Estimation of Vehicle Mass and Road Grade"; Clemson University Tiger Prints; Aug. 2008; https://tigerprints.clemson.edu/all_theses/412.

International Search Report and Written Opinion of the International Searching Authority dated Dec. 20, 2019; International Application No. PCT/US2019/049882; European Patent Office; Rijswijk, Netherlands.

Final Office Action dated Jun. 8, 2021; U.S. Appl. No. 16/562,715; United States Patent and Trademark Office; Alexandria, Virginia.

Non-Final Office Action dated Feb. 12, 2021; U.S. Appl. No. 16/562,715; United States Patent and Trademark Office; Alexandria, Virginia.

Non-Final Office Action dated Oct. 1, 2021; U.S. Appl. No. 16/562,715; United States Patent and Trademark Office; Alexandria, Virginia.

Notice of Allowance dated Feb. 11, 2022; U.S. Appl. No. 16/562,715; United States Patent and Trademark Office; Alexandria, Virginia.

Notification of the First Office Action dated Jan. 17, 2022; Chinese Application No. 201980057542.3; China National Intellectual Property Administration; Beijing, China.

First Search dated Jan. 6, 2022; Chinese Application No. 201980057542.3; China National Intellectual Property Administration; Beijing, China.

Chinese Notification to Grant dated Jan. 20, 2023; Chinese Application No. 201980057542.3; China National Intellectual Property Administration.

Hammer, Joe K.; Related U.S. Continuation U.S. Appl. No. 18/459,583 entitled "System and Method for Controlling a Maximum Vehicle Speed for an Industrialvehicle Based on a Calculated Load", filed Sep. 1, 2023; United States Patent and Trademark Office, Alexandria, Virginia.

Henrot, Benoist; Examiner Requisition dated Nov. 8, 2023; Canadian Application No. 3,109,297; CIPO; Quebec, Canada.

* cited by examiner

SYSTEM AND METHOD FOR CONTROLLING A MAXIMUM VEHICLE SPEED FOR AN INDUSTRIAL VEHICLE BASED ON A CALCULATED LOAD

RELATED APPLICATION

This application is a continuation of U.S. patent application Ser. No. 16/562,715, filed Sep. 6, 2019, entitled "System and Method for Controlling a Maximum Vehicle Speed for an Industrial Vehicle Based on a Calculated Load," which claims the benefit of U.S. Provisional Patent Application Ser. No. 62/730,810, filed on Sep. 13, 2018 and entitled "System and Method for Controlling a Maximum Vehicle Speed for an Industrial Vehicle Based on a Calculated Load," the disclosure of which are incorporated by reference herein in their entirety.

FIELD OF THE INVENTION

The present invention relates generally to materials handling vehicles, and, more particularly, to controlling a traction speed of the vehicle.

BACKGROUND OF THE INVENTION

Forklifts and other types of industrial vehicles are expected to operate under a variety of different conditions. Further, such vehicles typically include a number of different functional systems such as a traction system to control a traveling speed of the vehicle and a steering system to control a direction in which the vehicle travels.

Under various vehicle operating conditions, it may be beneficial to control a maximum vehicle speed such as, for example, when a vehicle is moving a load.

BRIEF SUMMARY OF THE INVENTION

Aspects of the present invention relate to a method for controlling a maximum vehicle speed for an industrial vehicle. This method includes determining, by a processor of the industrial vehicle, a torque applied to the traction wheel of the industrial vehicle; and determining, by the processor of the industrial vehicle, an acceleration of the industrial vehicle while the torque is applied to the traction wheel. The method also includes calculating, by the processor of the industrial vehicle, a load being moved by the industrial vehicle, based at least in part on the acceleration and the torque applied to the traction wheel. The method further includes controlling, by the processor of the industrial vehicle, the maximum speed of the industrial vehicle based on the calculated load being moved by the industrial vehicle. As an example, the load can comprise one or more trailers being pulled by the industrial vehicle. Another example, the industrial vehicle can comprise a fork assembly for carrying the load.

Additional aspects of the present invention relate to determining, by the processor of the industrial vehicle, whether the industrial vehicle has traveled more than a predetermined distance from previously being stopped, wherein calculating the load being moved by the industrial vehicle is delayed until the industrial vehicle is determined to have traveled more than the predetermined distance.

Additional aspects of the present invention relate to determining, by the processor of the industrial vehicle, the maximum speed of the industrial vehicle based on the calculated load and a grade of a path being traveled by the industrial vehicle.

Other aspects of the present invention relate to determining, by the processor of the industrial vehicle, a rolling resistance of the industrial vehicle while moving the load, wherein calculating the load being moved by the industrial vehicle is based at least in part on the rolling resistance.

Other aspects of the present invention relate to determining, by the processor of the industrial vehicle, a grade of a path being traveled by the industrial vehicle while moving the load, wherein calculating the load being moved by the industrial vehicle is based at least in part on the grade.

Additional aspects of calculating the load in accordance with the principles of the present invention relate to calculating a set comprising at least a minimum number of individual values of the load being moved by the industrial vehicle; and averaging the at least a minimum number of individual values to determine a respective value for the set. Further aspects of the present invention relate to collecting, by the processor of the industrial vehicle, a plurality of the sets of individual values of the load being moved by the vehicle; and averaging the respective values of the plurality of sets to determine the calculated load.

An additional aspect of the present invention relates to defining, by the processor of the industrial vehicle, an initial value of the calculated load to be the maximum load the industrial vehicle is designed to move.

Another aspect of the present invention relates to determining, by the processor of the industrial vehicle, when a lift mechanism of the industrial vehicle is being raised or lowered, wherein calculating the load being moved by the industrial vehicle based on the acceleration and the torque may not be performed while the lift mechanism is being raised or lowered. Additionally another aspect of the present invention relates to, in response to determining the lift mechanism of the industrial vehicle is being raised or lowered, defining, by the processor of the industrial vehicle, the calculated load to be the maximum load the industrial vehicle is designed to move.

Additional aspects of the present invention relate to calculating a set comprising a predetermined number of individual values of the load being moved by the industrial vehicle in response to the industrial vehicle accelerating above a first predefined value and traveling at least a predetermined distance; and averaging the predetermined number of individual values to determine a respective value for the set. The predetermined number of individual values of the load may be equal to or less than 200.

An additional aspect of calculating the load in accordance with the principles of the present invention relates to detecting, by the processor of the industrial vehicle, a first operating condition that comprises: a) an acceleration of the industrial vehicle is less than the first predefined value, and b) a speed of the industrial vehicle is less than a second predefined value; subsequent to the first operating condition, determining, by the processor of the industrial vehicle, a second operating condition comprising the industrial vehicle, within a predefined time period after the first operating condition: a) begins accelerating again above the first predefined value, and b) has traveled the predetermined distance; in response to occurrence of the first operating condition and occurrence of the second operating condition within the predefined time period after the first operating condition, collecting, by the processor of the industrial vehicle, a further set of individual values of the load being moved by the industrial vehicle; and averaging the respective values of the plurality of sets to calculate the calculated load.

An additional aspect of calculating the load in accordance with the principles of the present invention relates to detecting, by the processor of the industrial vehicle, a first operating condition that comprises: a) an acceleration of the industrial vehicle is less than the first predefined value, and b) a speed of the industrial vehicle is less than a second predefined value; subsequent to the first operating condition, determining, by the processor of the industrial vehicle, a third operating condition comprising the speed of the industrial vehicle, within a predefined time period after the first operating condition, does not reach or exceed the second predefined value; in response to occurrence of the first operating condition and occurrence of the third operating condition within the predefined time period after the first operating condition, defining, by the processor of the industrial vehicle, the calculated load to be the maximum load the industrial vehicle is designed to move.

Aspects of the present invention relate to a system for controlling a maximum vehicle speed for an industrial vehicle. The system includes a memory device storing executable instructions; and a processor in communication with the memory device. In particular, the processor, when executing the executable instructions: a) determines a torque applied to the traction wheel of the industrial vehicle; b) determines an acceleration of the industrial vehicle while the torque is applied to the traction wheel; c) calculates a load being moved by the industrial vehicle based at least in part on the acceleration and the torque; and d) controls a maximum speed of the industrial vehicle based on the calculated load being moved by the industrial vehicle. As an example, the load can comprise one or more trailers being pulled by the industrial vehicle. As another example, the industrial vehicle can comprise a fork assembly for carrying the load.

Additional aspects of the present invention relate to wherein the processor when executing the executable instructions determines whether the industrial vehicle has traveled more than a predetermined distance from previously being stopped; and wherein calculating the load being moved by the vehicle is delayed until the industrial vehicle is determined to have traveled more than the predetermined distance.

Another aspect of the present invention relates to wherein the processor when executing the executable instructions determines the maximum speed of the industrial vehicle based on the calculated load and a grade of a path being traveled by the industrial vehicle.

Additional aspects of the present invention relate to the processor determining a rolling resistance of the industrial vehicle while moving the load, wherein calculating the load being moved by the industrial vehicle is based at least in part on the rolling resistance.

Additional aspects of the present invention relate to the processor determining a grade of a path being traveled by the industrial vehicle while moving the load, wherein calculating the load being moved by the industrial vehicle is based at least in part on the grade.

Other aspects of the present invention relate to wherein the processor when executing the executable instructions calculates a set comprising at least a minimum number of individual values of the load being moved by the industrial vehicle; and averages the at least a minimum number of individual values to determine a respective value for the set. Further, the processor when executing the executable instructions collects a plurality of the sets of individual values of the load being moved by the vehicle; and averages the respective values of the plurality of sets to determine the calculated load.

In accordance with an additional aspect of the present invention the processor when executing the executable instructions defines an initial value of the calculated load to be the maximum load the industrial vehicle is designed to move.

In accordance with another aspect of the present invention the processor when executing the executable instructions determines when a lift mechanism of the industrial vehicle is being raised or lowered, wherein calculating the load being moved by the industrial vehicle based on the acceleration and torque is not performed while the lift mechanism is being raised or lowered. Further, the processor when executing the executable instructions can define the calculated load to be the maximum load the industrial vehicle is designed to move, in response to determining the lift mechanism of the industrial vehicle is being raised or lowered.

In accordance with yet another aspect of the present invention the processor when executing the executable instructions calculates a set comprising a predetermined number of individual values of the load being moved by the industrial vehicle in response to the industrial vehicle accelerating above a first predefined value and traveling at least a predetermined distance; and averages the predetermined number of individual values to determine a respective value for the set.

In accordance with an additional aspect of the present invention the processor when executing the executable instructions detects a first operating condition that comprises: a) an acceleration of the industrial vehicle is less than the first predefined value, and b) a speed of the industrial vehicle is less than a second predefined value; subsequent to the first operating condition, determines a second operating condition comprising the industrial vehicle, within a predefined time period after the first operating condition: a) begins accelerating again above the first predefined value, and b) has traveled the predetermined distance; in response to occurrence of the first operating condition and occurrence of the second operating condition within the predefined time period after the first operating condition, collects a further set of individual values of the load being moved by the industrial vehicle; and averages the respective values of the plurality of sets to calculate the calculated load.

In accordance with another aspect of the present invention the processor when executing the executable instructions detects a first operating condition that comprises: a) an acceleration of the industrial vehicle is less than the first predefined value, and b) a speed of the industrial vehicle is less than a second predefined value; subsequent to the first operating condition, determines a third operating condition comprising the speed of the industrial vehicle, within a predefined time period after the first operating condition, does not reach or exceed the second predefined value; and in response to occurrence of the first operating condition and occurrence of the third operating condition within the predefined time period after the first operating condition, defines the calculated load to be the maximum load the industrial vehicle is designed to move.

Another aspect of the present invention relates to the calculated load being calculated according to:

$$TVM = \frac{\left(\frac{(T_C - T_{IT}) \times \text{gearbox ratio} \times \text{gearbox efficiency}}{(9.8 \times \text{driven wheel radius})}\right)}{VA_g + G\% + R\%}.$$

where $T_C$ is a torque command, $T_{IT}$ is an inertial torque; gearbox ratio is a predetermined gearbox ratio of the industrial vehicle; gearbox efficiency is a predetermined gearbox efficiency of the industrial vehicle; driven wheel radius is a radius of the traction wheel; R % is a rolling resistance value; G % is a present grade as a percentage of a surface on which the industrial vehicle is traveling; $VA_g$ is the acceleration of the industrial vehicle in g's; and the individual load value=TVM−(an empty weight of the industrial vehicle).

Another aspect of the present invention relates to the torque applied to the traction wheel being converted an equivalent force $F_A$ and the calculated load being calculated according to:

$$\text{Total Vehicle Mass } (TVM) = \frac{\frac{F_A}{9.8}}{VA_g + G\% + R\%}$$

where $F_A$ is the equivalent force value; R % is a rolling resistance value; G % is a present grade as a percentage of a surface on which the industrial vehicle is traveling; $VA_g$ is the acceleration of the industrial vehicle in g's; and the individual load value=TVM−(an empty weight of the industrial vehicle).

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1A:
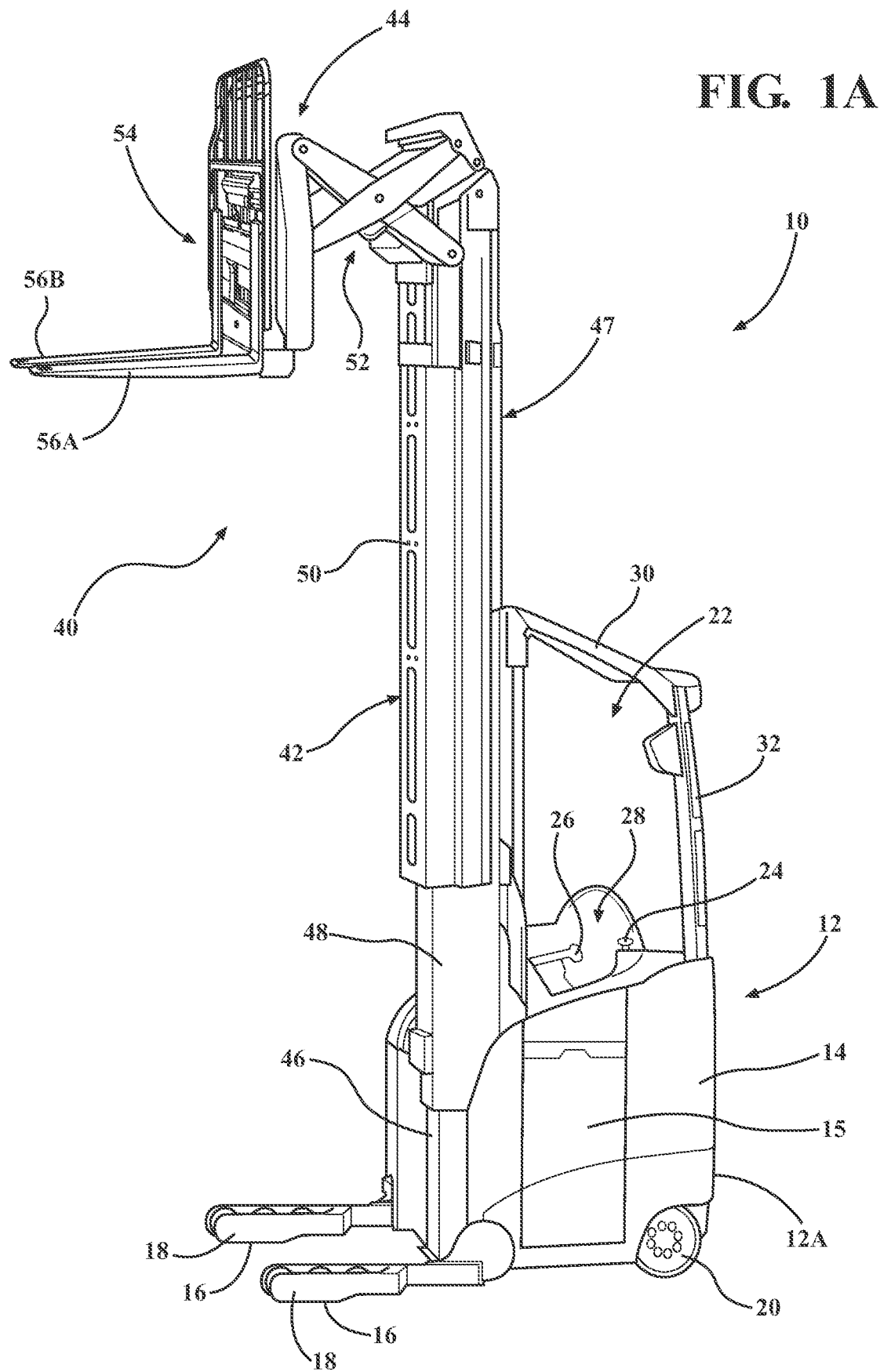
FIG. 1A is a perspective view of a materials handling vehicle according to an aspect of the present invention.

Referring now to FIG. 1A, a materials handling vehicle 10 (hereinafter "vehicle") is shown, which is a forklift truck.

The vehicle 10 includes a main body or power unit 12, which includes a frame 14 defining a main structural component of the vehicle 10 and which houses a battery 15. The vehicle 10 further comprises a pair of fork-side support wheels 16 coupled to first and second outriggers 18, a driven and steered wheel 20 (also referred to herein as a "traction wheel") mounted near a first corner at a rear 12A of the power unit 12, and a caster wheel (not shown) mounted to a second corner at the rear 12A of the power unit 12. The wheels 16, 20 allow the vehicle 10 to move across a floor surface.

An operator's compartment 22 is located within the power unit 12 for receiving an operator driving the vehicle 10. A tiller knob 24 is provided within the operator's compartment 22 for controlling steering of the vehicle 10. The speed and direction of movement (forward or reverse) of the vehicle 10 are controlled by the operator via a multi-function control handle 26 provided adjacent to an operator seat 28, which control handle 26 may control one or more other vehicle functions as will be appreciated by those having ordinary skill in the art. The vehicle 10 further includes an overhead guard 30 including a vertical support structure 32 affixed to the vehicle frame 14.

A load handling assembly 40 of the vehicle 10 includes, generally, a mast assembly 42 and a carriage assembly 44, which is movable vertically along the mast assembly 42. The mast assembly 42 is positioned between the outriggers 18 and includes a fixed mast member 46 affixed to the frame 14, and nested first and second movable mast members 48, 50. It is noted that the mast assembly 42 may include additional or fewer movable mast members than the two shown in FIG. 1A, i.e., the first and second movable mast members 48, 50. The carriage assembly 44 includes conventional structure including a reach assembly 52, a fork carriage 54, and fork structure comprising a pair of forks 56A, 56B. A movable assembly 47 as defined herein includes the lower and upper movable mast members 48, 50 and the carriage assembly 44. The mast assembly 42 may be configured as the monomast described in U.S. Pat. No. 8,714,311 to Steven C. Billger et al., granted on May 6, 2014 and assigned to the applicant, Crown Equipment Corporation, the entire disclosure of which is hereby incorporated by reference herein.

Figure 1B:
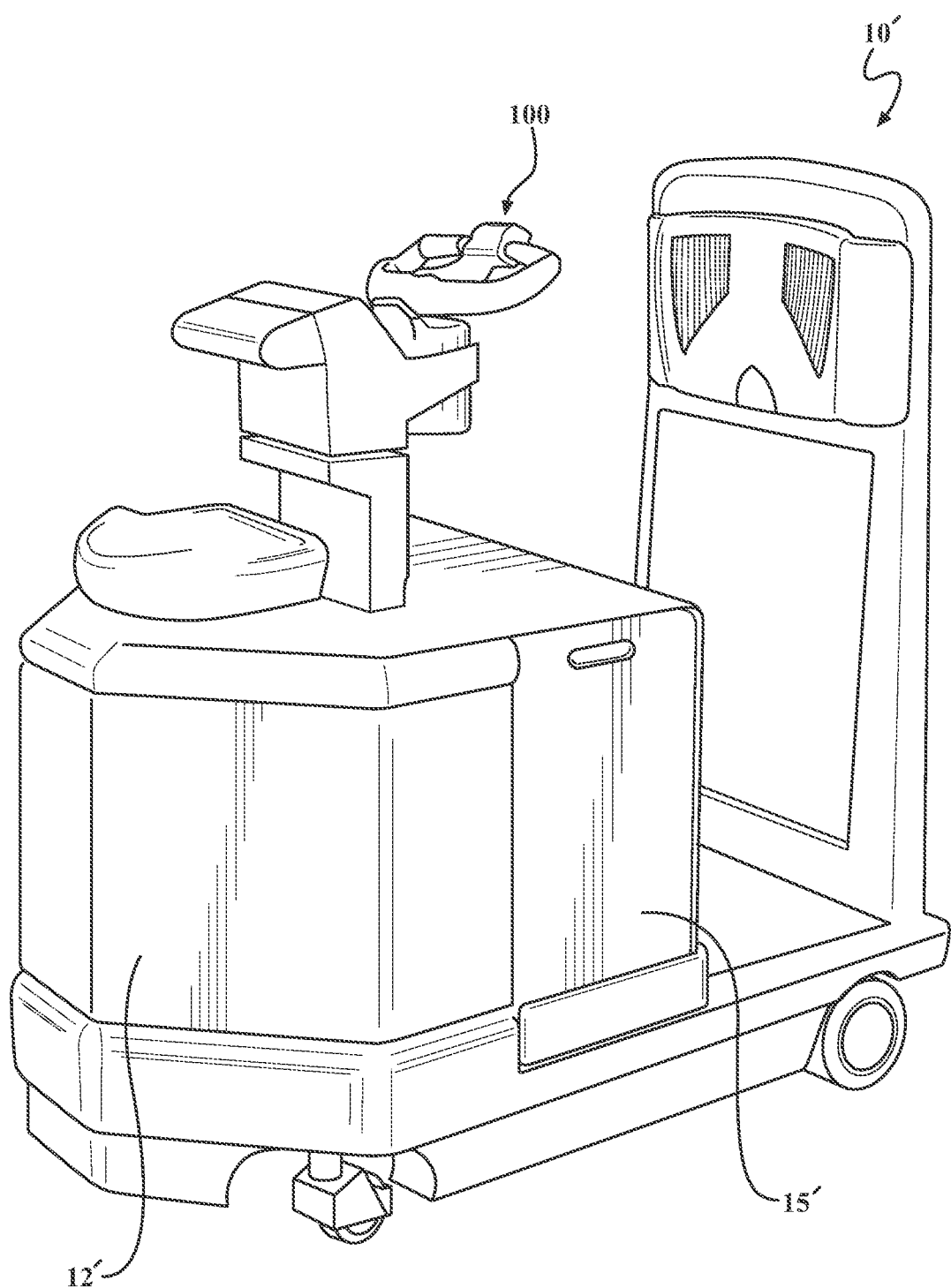
FIGS. 1B and 1C are views of another materials handling truck according to an aspect of the present invention.
Figure 1C:
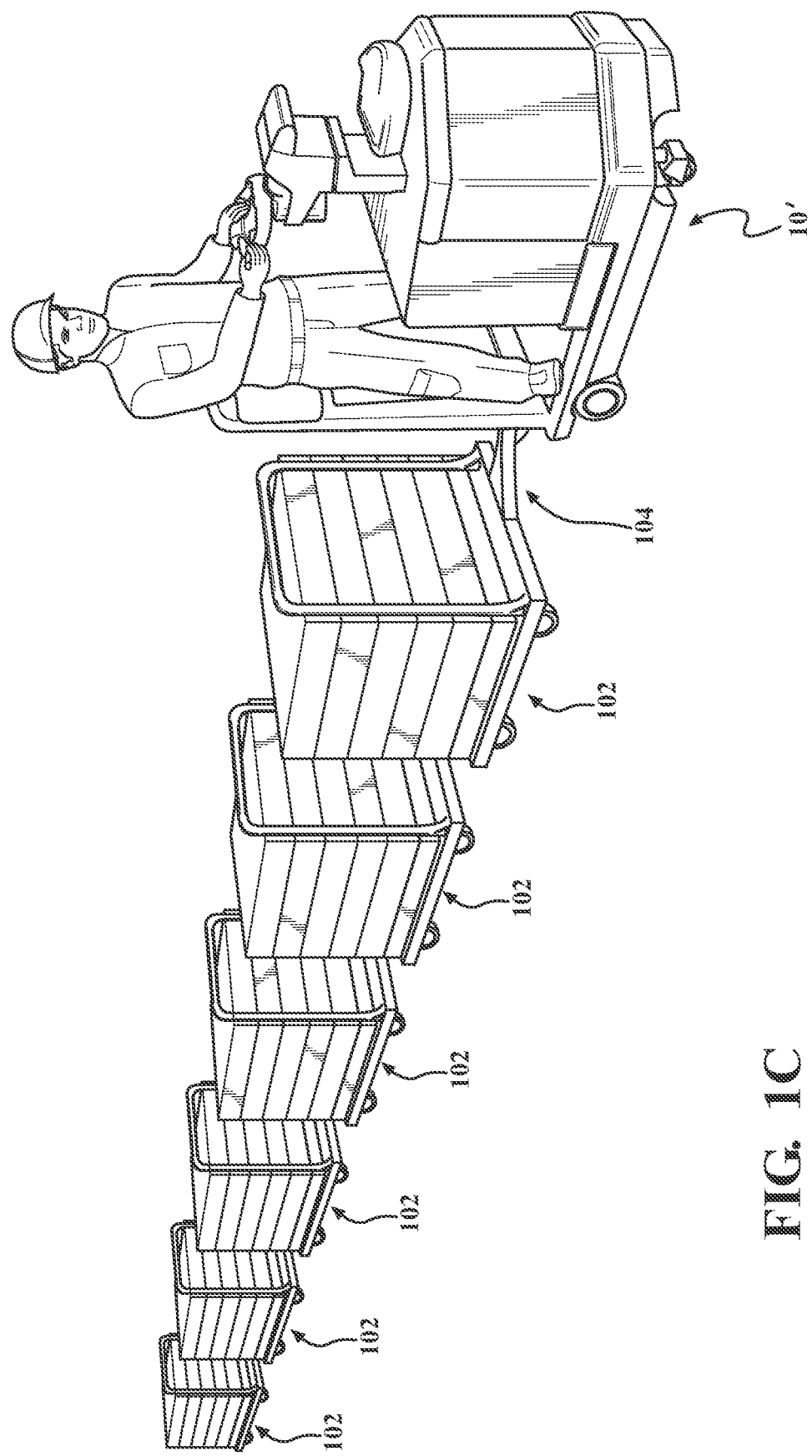

The vehicle 10 of FIG. 1A is provided by way of example and many different types of materials handling vehicles are contemplated within the scope of the present invention. For example, FIGS. 1B and 1C illustrate a tow tractor type industrial vehicle or materials handling vehicle 10'. Similar to the vehicle 10 of FIG. 1A, the tow tractor 10' includes a main body or power unit 12', which includes a frame defining a main structural component of the vehicle 10' and which houses a battery 15'. A traction and steered, or driven and steered, wheel (not shown), located on a corner portion of the power unit 12', drive and steer the tow tractor 10'. The speed, direction of movement (forward or reverse) and steering of the vehicle 10' are controlled by the operator via a multi-function control handle 100. The control handle 100 may control one or more other vehicle functions as will be appreciated by those having ordinary skill in the art.

As shown in FIG. 1C, the tow tractor 10' can be used to pull multiple trailers 102 that each have a respective linkage 104 for coupling to the vehicle 10' or another trailer 102. As explained in more detail below, when the vehicle 10' starts moving forward from a stopped state, the linkages or couplings 104 may have some slack such that all the trailers do not initially move forward together until the slack of all the linkages or couplings 104 is overcome.

While the present invention is described herein with reference to the illustrated materials handling vehicles 10 and 10', it will be apparent to those skilled in the art that the present invention may be used in a variety of other types of materials handling vehicles.

Figure 2A:
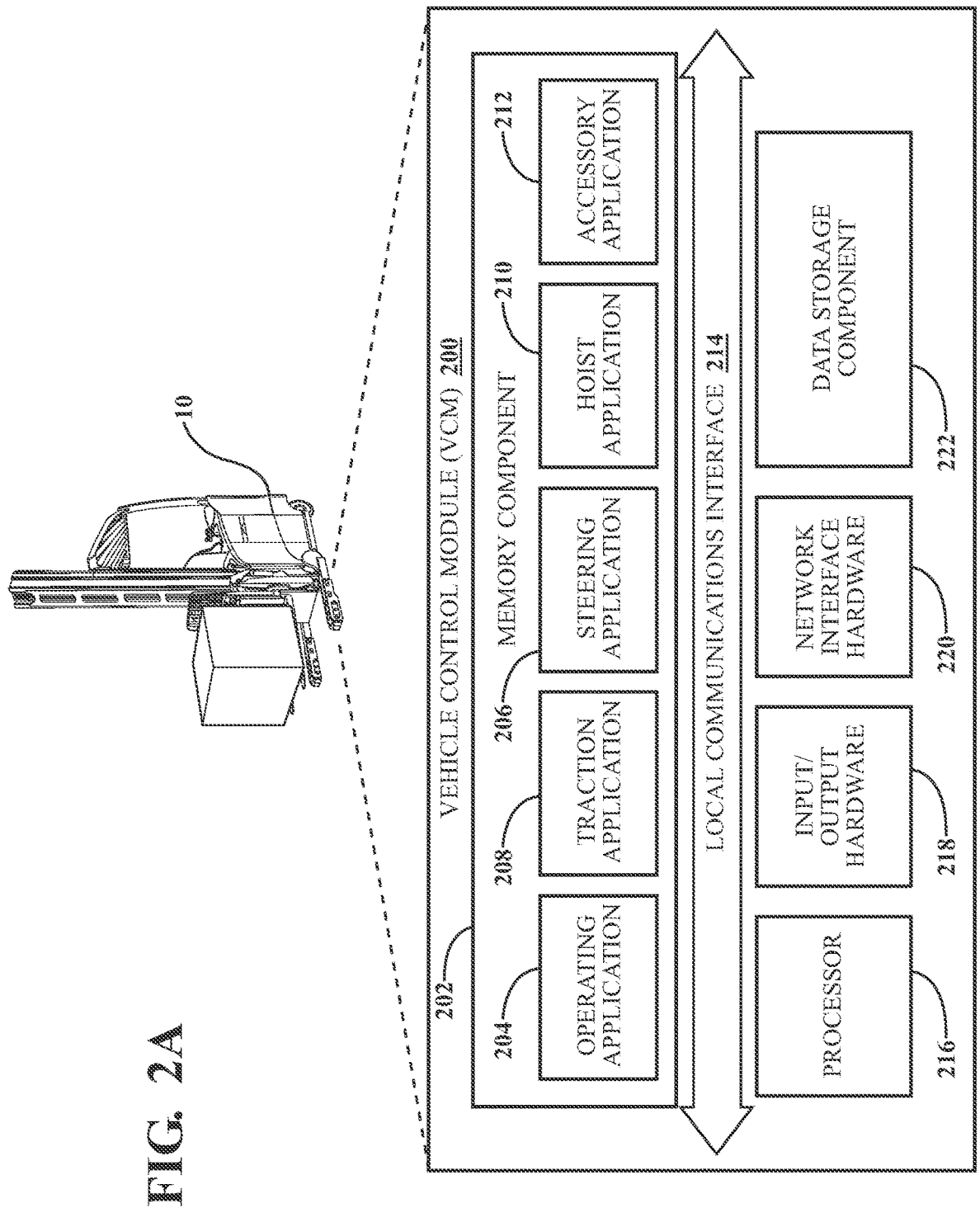
FIG. 2A depicts a computing environment for providing control logic in a vehicle control module (VCM) of the vehicle of FIGS. 1A-1C.

FIG. 2A depicts a block-level view of a computing environment for providing control logic and software applications in a vehicle control module (VCM) 200, according to one or more embodiments shown and described herein. The vehicle control module 200 and the way it interfaces with various operator controls and other functional systems of the vehicle 10 may be similar to control structure disclosed in U.S. Patent Publication Nos. 2010/0228428, 2014/0188324 and 2017/0043787, the disclosures of which are incorporated herein by reference in their entireties. The VCM is one of a number of cooperating modules, such as, in addition to a traction control module (TCM) or a steering control module (SCM), that cooperatively control operation of the vehicle 10 or 10.' Each of the cooperating modules may comprise one or more respective processors, memories storing executable program code, and other circuitry configured to perform their individual functions, as well as communicate with one another, as described in detail below. The TCM may also be referred to herein as a "traction controller" and the SCM may also be referred to herein as a "steering controller".

In the illustrated embodiment, the VCM 200 includes one or more processors or microcontrollers 216, input/output hardware 218, network interface hardware 220, a data storage component 222, and a memory component 202. The data storage component 222 and the memory component 202 may each be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Any stored information that is intended to be available after the vehicle 10, 10' is shutdown and restarted may beneficially be stored in non-volatile memory. Also, depending on the particular embodiment, the non-transitory computer-readable medium, mentioned above, may reside within the VCM 200 and/or external to the VCM 200.

Additionally, the memory component 202 may store software or applications that can be executed (i.e., using executable code) by the one or more processors or microcontrollers 216.

Thus, the memory component 202 may store an operating application or logic 204, a traction application or logic 208, a steering application or logic 206, a hoist application or logic 210, and accessory application(s) or logic 212. The operating logic 204 may include an operating system and other software such as, for example, diagnostic-related applications for managing components of the VCM 200. The traction application or logic 208 may be configured with one or more algorithms and parameters for facilitating optimal traction control for the vehicle 10, 10'. The steering application or logic 206 may be configured with one or more algorithms and parameters for facilitating optimal steering control of the vehicle 10 or 10'. The hoist application or logic 210 may include one or more algorithms and parameters for facilitating optimal hoist control of the vehicle 10, 10', which acts as the primary load handling assembly system used to raise and lower the moveable assembly 47 of the vehicle 10. Additionally, the accessory application or logic 212 may include one or more algorithms and parameters for providing control of accessories of the vehicle 10, 10' such as an auxiliary load handling assembly system, which performs additional tasks such as tilt and sideshift of the carriage assembly 44. A local communication interface 214 is also included in FIG. 2A and may be implemented as a bus or other communication interface to facilitate communication among the components of the VCM 200.

The one or more processors or microcontrollers 216 may include any processing component operable to receive and execute instructions (such as program code from the data storage component 222 and/or the memory component 202). The processors or microcontrollers 216 may comprise any kind of a device which receives input data, processes that data through computer instructions, and generates output data. Such a processor can be a microcontroller, a hand-held device, laptop or notebook computer, desktop computer, microcomputer, digital signal processor (DSP), mainframe, server, cell phone, personal digital assistant, other programmable computer devices, or any combination thereof. Such processors can also be implemented using programmable logic devices such as field programmable gate arrays (FPGAs) or, alternatively, realized as application specific integrated circuits (ASICs) or similar devices. The term "processor" is also intended to encompass a combination of two or more of the above recited devices, e.g., two or more microcontrollers.

The input/output hardware 218 may include and/or be configured to interface with a monitor, positioning system, keyboard, touch screen, mouse, printer, image capture device, microphone, speaker, gyroscope, compass, and/or other device for receiving, sending, and/or presenting data. The network interface hardware 220 may include and/or be configured for communicating with any wired or wireless networking hardware, including an antenna, a modem, LAN port, wireless fidelity (Wi-Fi) card, WiMax card, mobile communications hardware, and/or other hardware for communicating with other networks and/or devices. From this connection, communication may be facilitated between the VCM 200 and other computing devices including other components coupled with a CAN bus or similar network on the vehicle 10 or 10'.

It should be understood that the components illustrated in FIG. 2A are merely exemplary and are not intended to limit the scope of this disclosure. While the components in FIG. 2A are illustrated as residing within the VCM 200, this is merely an example. In some embodiments, one or more of the components may reside external to the VCM 200. It should also be understood that while the VCM 200 in FIG. 2A is illustrated as a single device; this is also merely an example. In some embodiments, the traction application 208, the steering application 206, the hoist application 210, and/or the accessory application 212 may reside on different devices. Additionally, while the VCM 200 is illustrated with the traction application 208, the steering application 206, the hoist application 210, and the accessory application 212 as separate logical components, this is also an example. In some embodiments, a single, composite software application may cause the VCM 200 to provide the described functionality.

It also should be understood that the VCM 200 may communicate with various sensors and other control circuitry of the vehicle 10 to coordinate the various conditions of manual operation and automatic operation of the vehicle 10.

Figure 2B:
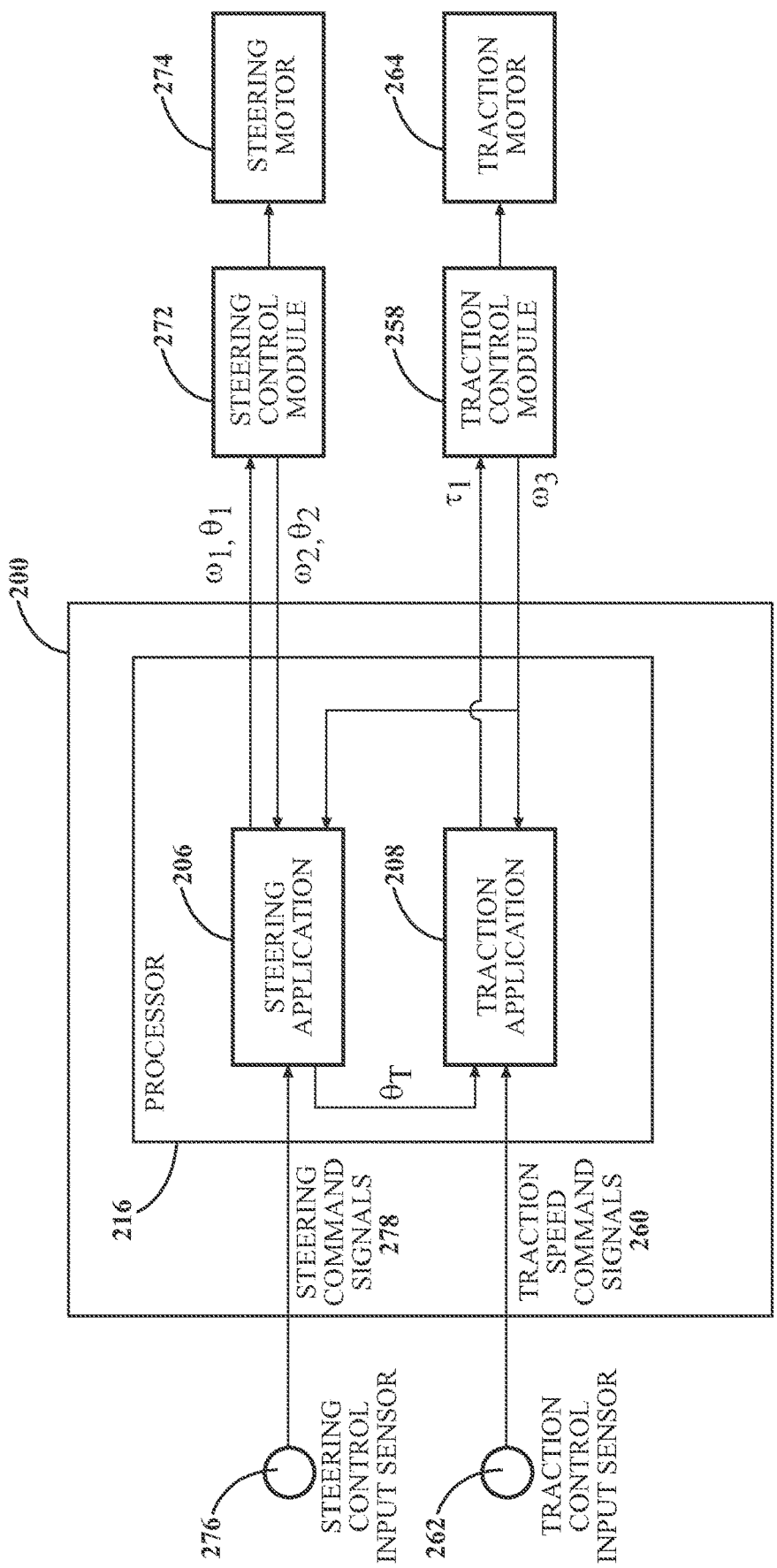
FIG. 2B schematically illustrates selected features of a vehicle and an example vehicle control module (VCM) in accordance with the principles of the present invention.

FIG. 2B schematically illustrates selected features of a vehicle 10 or 10' and an example vehicle control module 200 that are helpful in describing vehicle control operations that utilize a traction application and steering application. The other features of the vehicle 10 or 10' and the VCM 200 described with respect to FIG. 1A and FIG. 2A are omitted from FIG. 2B so as not to obscure aspects of the example control of vehicle operations described herein.

Referring to FIG. 2B, the VCM 200 includes a processor 216 illustrated to include the steering application 206, the traction application 208 and other applications (not shown) to be executed by the processor 216. In other example embodiments, the VCM 200 can include more than one microcontroller such as a master microcontroller and a slave microcontroller.

In FIG. 2B, an operator-controlled steering control input sensor 276 forming part of a steering device comprising the tiller knob 24 of the vehicle 10 set out in FIG. 1A, provides sensor output signal values defining a steering command signal or signals 278 (e.g., an analog voltage) to the vehicle control module (VCM) 200. The operator control handle 100 of the vehicle 10' in FIGS. 1B and 1C can be similarly configured. The steering control input sensor 276 may also form part of another steering device comprising a steering wheel, a steering tiller or like steering element. The steering command signals 278 may be adjusted or otherwise conditioned and may, for example, be provided to an input pin of the processor 216 within the VCM 200. That signal may be further conditioned and supplied as an input value to the steering application 206 that is being executed by the processor 216. The voltage, for example, of the steering command signals 278, or the rate of change of that voltage, can vary based on the position and the rate of change of position of the steering control input sensor 276 associated with the steering device, i.e., the tiller knob 24 in the illustrated embodiment. Based on the input signal the steering application 206 receives that corresponds to the steering command signals 278, the steering application 206 determines a setpoint for a control attribute related to the steered wheel 20 of the vehicle. For example, a voltage value can be used along with a lookup table to correlate the voltage value to a particular wheel angle value for a steering setpoint or the rate of change of the voltage could be multiplied by a predetermined scaling factor to convert that rate of change into the setpoint that changes a steering motor angular velocity. Hence, the control attribute may, for example, be a steered wheel angle or an angular velocity of a steering motor 274 and, therefore, a value of the setpoint may be a steered wheel angle $\theta_1$ or a steering motor angular velocity $\omega_1$. The steering setpoint $\omega_1$ or $\theta_1$ can be provided to a steering control module (SCM) 272. The SCM 272 uses the setpoint $\omega_1$ or $\theta_1$ for controlling a steering motor 274 which positions the steered wheel 20 to conform to a desired position as indicated by the operator's manipulation of the steering control input sensor 276. The SCM 272 can also provide a feedback value $\theta_2$ or $\omega_2$ of the control attribute related to the steered wheel. In particular, the feedback value is a measured, or actual, steered wheel angle $\theta_2$ of the steered wheel 20 or is a measured, or actual, angular velocity $\omega_2$ of the steering motor 274. The SCM 272 can, for example, provide the feedback value $\theta_2$ or $\omega_2$ to the steering application 206.

The steering application 206 additionally produces a target steering angle $\theta_T$ which is provided to the traction application 208, which may be calculated as discussed in U.S. Patent Publication No. 2017/0043787, which was previously incorporated herein by reference. The target steering angle $\theta_T$ received at the traction application 208 from the steering application 206 serves as a limiting constraint that is converted by the traction application 208 to a traction control speed limit via a predetermined desired speed-to-wheel-angle relationship and is used in the determination of a desired traction speed setting $\omega_4$ and a traction torque setpoint $\tau_1$. The traction wheel speed, or a traction motor speed, can be considered a control attribute related to the traction wheel or driven wheel 20 of the vehicle 10, and the desired traction speed setting $\omega_4$, for either a traction motor 264 or the traction wheel 20, and the traction torque setpoint $\tau_1$, for the traction motor, can be considered to be respective setpoints for this control attribute related to the traction wheel.

The traction torque setpoint $\tau_1$ can be provided to a traction control module (TCM) 258. The TCM 258 uses the traction torque setpoint $\tau_1$ for controlling the operation of the traction motor 264. The TCM 258 monitors the traction motor 264 and provides a traction feedback speed $\omega_3$ to the traction application 208 and the steering application 206. The traction feedback speed $\omega_3$ may be an angular speed/velocity of either the traction motor 264 or the driven wheel 20, as discussed further below. It may be beneficial in some embodiments to convert the traction speed, or speed feedback, $\omega_3$, to an actual linear speed of the vehicle 10 by the traction application 208. If, for example, the speed feedback $\omega_3$ was an angular speed of the traction motor 264, then the traction application 208 could scale that value to an actual linear speed, $v_3$, of the vehicle 10 based on a) a gearing ratio between the traction motor 264 and the driven wheel 20 and b) the circumference of the driven wheel 20. Alternatively, if the speed feedback $\omega_3$ was an angular speed of the driven wheel 20, then the traction application 208 could scale that value to an actual linear speed, $v_3$, of the vehicle 10 based on the circumference of the driven wheel 20. The linear speed of the vehicle equals the linear speed of the driven wheel 20, presuming there is no slip at the driven wheel.

The traction setpoint $\tau_1$ is determined by the traction application 208 based on traction speed command signals 260 received from an operator controlled traction speed control input sensor 262, such as the multi-function control handle 26 of the vehicle 10, and the target steering angle $\theta_T$ output from the steering application 206. The traction setpoint Ti is output from the traction application 208 to the TCM 258 as a torque value which results in a corresponding speed of a traction motor 264 under the control of the TCM 258.

It is also beneficial to have the ability to control a vehicle's speed as a function of a trailer load, or fork load, in order to ensure safe braking. In particular, embodiments of the present invention relate to determining, or estimating, a vehicle's load without any means of direct measurement of that load. In some instances the vehicle 10 or 10' when empty may weigh approximately 1,000 kg but can tow up to a 5,000 kg load.

Figure 3A:
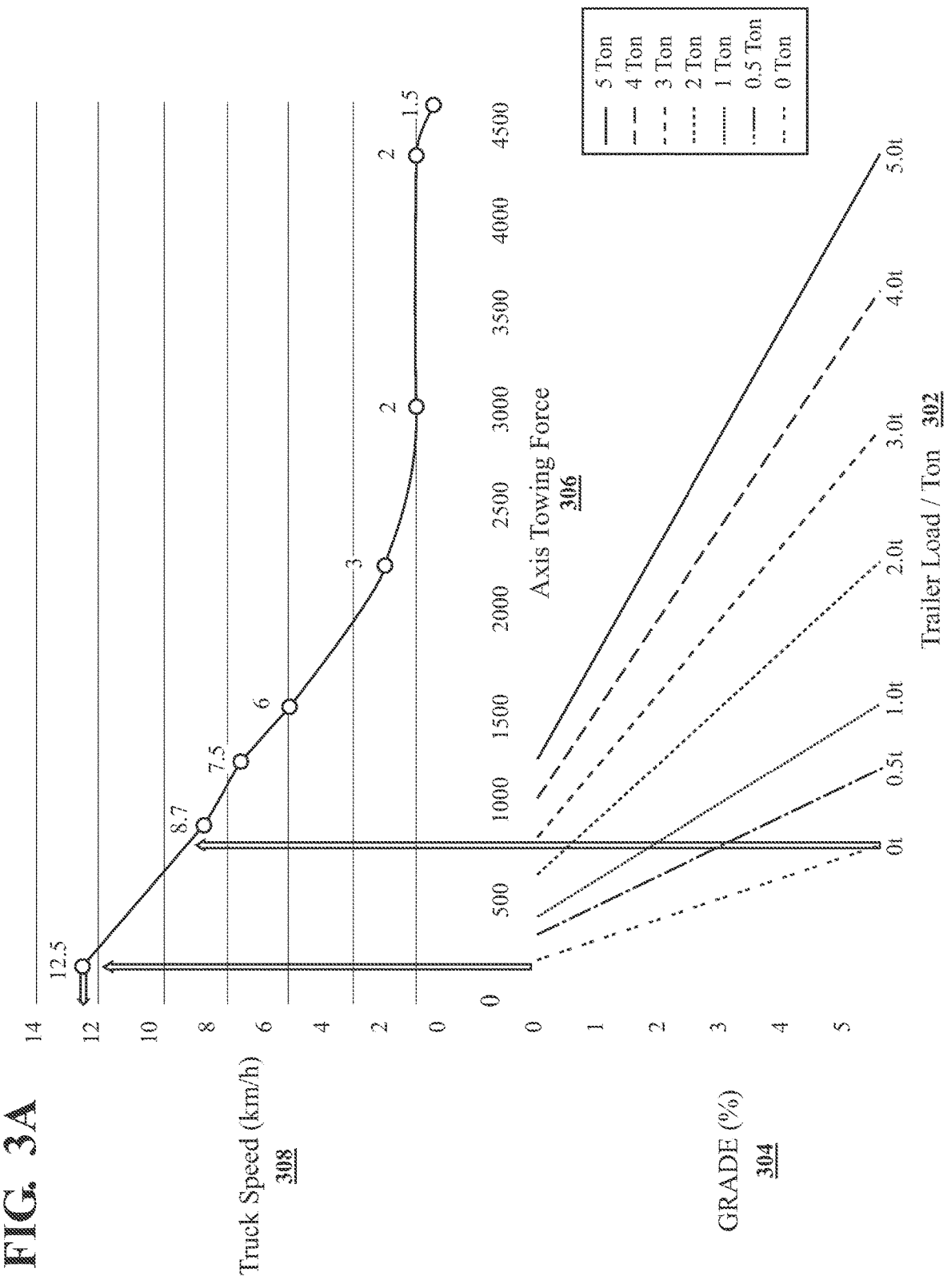
FIGS. 3A and 3B are charts depicting the relationship between vehicle load, maximum travel speed, and surface grade in accordance with the principles of the present invention.

The top part of the chart of FIG. 3A has a vertical axis 308 that represents a maximum speed for a vehicle 10 or 10' based on the braking capacity of the vehicle 10 or 10'. The horizontal axis 306 represents a towing force that may depend on a grade over which the vehicle is traveling and a weight of the vehicle's current load. The lower part of the chart of FIG. 3A has a horizontal 302 axis that represents a load being moved by the vehicle 10 or 10' and a vertical axis 304 that represents the grade (in FIG. 3A any percentage greater than 0% is a downhill grade) over which the vehicle is traveling.

Figure 3B:
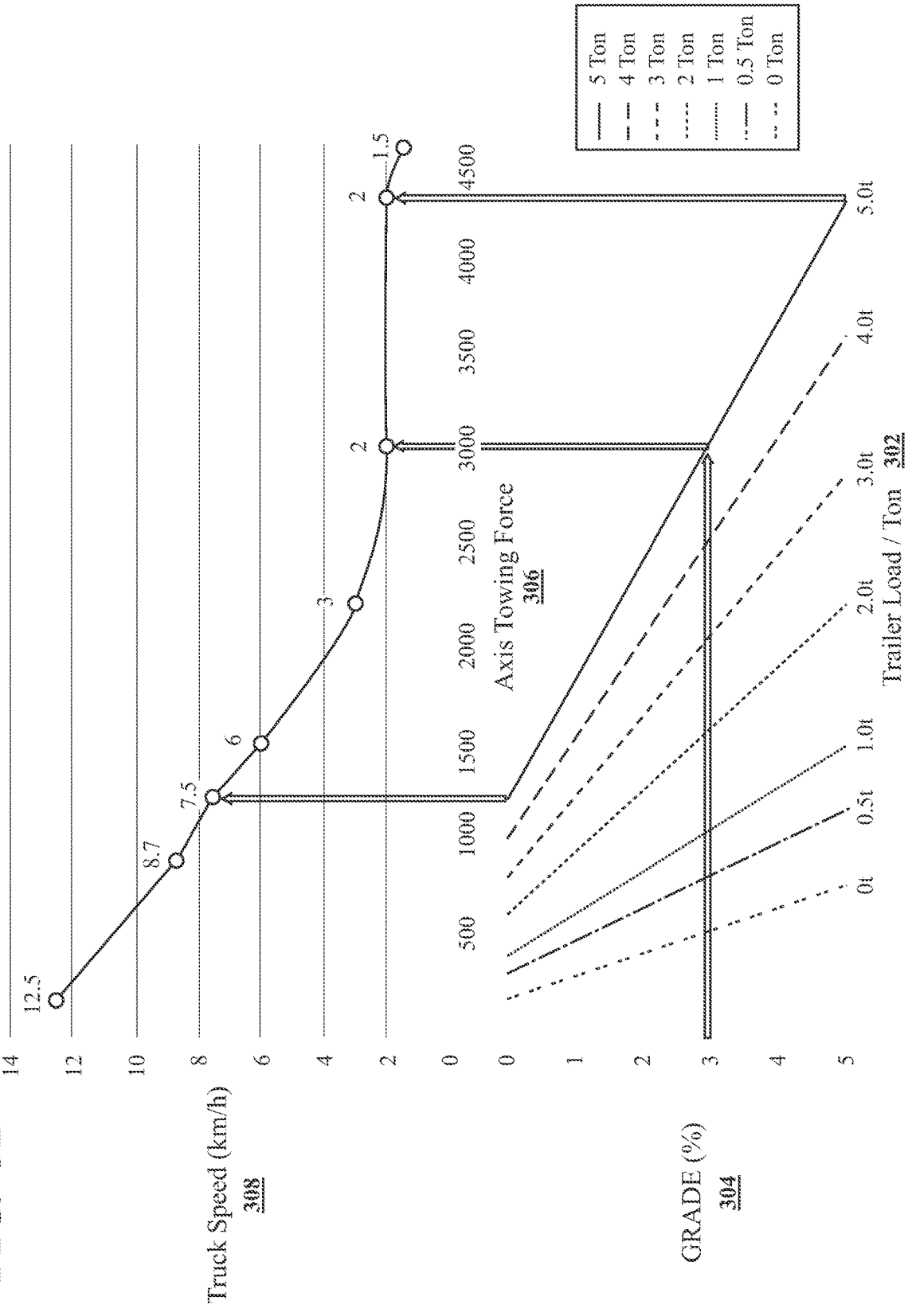

The maximum allowable speed is 12.5 kilometers/hour (kph) for a vehicle with no load and traveling on a level floor. On a 5% downhill grade, however, the same vehicle would have a maximum allowable speed of 9.2 kph. FIG. 3B is a chart similar to that of FIG. 3A but highlights that if the vehicle is moving a load of 5 metric tons or 5,000 kg, then the maximum allowable speed is 7.5 kph on a level floor and 2.0 kph for any downhill grade over 3%.

One of ordinary skill will recognize that for a tow tractor 10' or forklift truck 10, the force to accelerate a vehicle can be supplied by an electric motor's or internal combustion engine's output torque. By way of example only, and not intending to limit aspects of the present invention, the description below describes using a three-phase induction motor, the traction motor 264 in the illustrated embodiment, and the processor 216 in the illustrated embodiment, to control the traction speed of the vehicle 10 or 10'. In theory, if the output torque of such a motor is known with a high level of fidelity at any instance in time, then an equivalent force could be determined by converting the rotational torque to the equivalent linear force by way of a gearbox ratio ("gearbox ratio," as used herein, means the ratio of the driven wheel RPM to the electric motor's shaft RPM) and a diameter of the driven wheel 20. The equivalent force (Newtons) applied to the vehicle 10 or 10' would be the motor torque (Nm) times the product of Gearbox Ratio and the Gearbox Efficiency ("gearbox efficiency," as used herein, is indicative of a torque loss or power loss as a percentage of the motor torque), divided by the radius of the driven or traction wheel 20 (meters). An acceleration of the vehicle (meters/sec') can be calculated by the processor 216 using the change in rotational or angular speed of the traction motor 264 (rpm), which angular speed values are received from the traction control module 258, divided by 60 sec/min, divided by the gearbox ratio, multiplied by the rotational circumference of the driven or traction wheel 20 (meters) and divided by the sample rate (seconds) of the angular speed provided by the traction control module 258.

However, there are additional significant forces acting on a vehicle 10 or 10' as it accelerates that also can be accounted for when converting motor torque to an equivalent force. There is an amount of torque required to accelerate the inertia of rotational components of the vehicle 10, 10', such as the motor rotor, gears, and driven wheel 20. There is also rolling resistance and road surface grade or incline which contribute in a positive or negative manner depending on if the vehicle 10 or 10' is accelerating up or down an incline. Therefore, total force required for a vehicle to move a load can be calculated according to EQUATION 1, which is as follows:

> Total Force Required=(Force to Accelerate Total Vehicle and Load Mass)+(Force to climb/descend Grade)+(Force to Accelerate the Inertia of Rotational Components)+(Force to overcome Rolling Resistance)

As stated above, vehicle acceleration can be calculated by converting traction motor rotational acceleration to linear acceleration, assuming there is no tire slippage. Alternatively, an accelerometer may be present on the vehicle 10 or 10' and sense the vehicle's acceleration directly. An incline/decline grade can be determined by using the same onboard accelerometer or a combination of an accelerometer and a gyro. The torque required to accelerate the inertia of the vehicle's rotational components, such as the motor rotor, gears, and driven wheel 20, can be calculated by determining the moment of inertia (i.e., rotational inertia) of the rotating components described earlier and multiplying by an angular acceleration of the traction motor 264. This "rotational inertia" value can be a pre-calculated constant value, is different for different vehicles and can be easily calculated as is well known to those skilled in the art. Rolling resistance or rolling resistance force is a function of many varying vehicle and environmental factors such as vehicle and load weight, tire materials, temperature, and floor conditions. A constant rolling resistance value is estimated, which is equal to a percentage, e.g., 1.5%. Hence, a rolling resistance force could be determined by multiplying the constant rolling resistance value, e.g., 0.015, by the weight of the vehicle in combination with any load. Rolling resistance or rolling resistance force is relatively constant once the vehicle is moving.

At steady state travel (i.e., no acceleration of the vehicle) on a level surface, the rolling resistance is likely to be the most significant drag on the vehicle 10 or 10' but under heavy acceleration, the rolling resistance can become the least significant. Therefore, as described below, in accordance with the principles of the present invention the calculations regarding a vehicle's load can be performed while the vehicle is under heavy acceleration to put greater significance to the (Force to Accelerate Total Vehicle and Load Mass) component in EQUATION 1 above.

Figure 4:
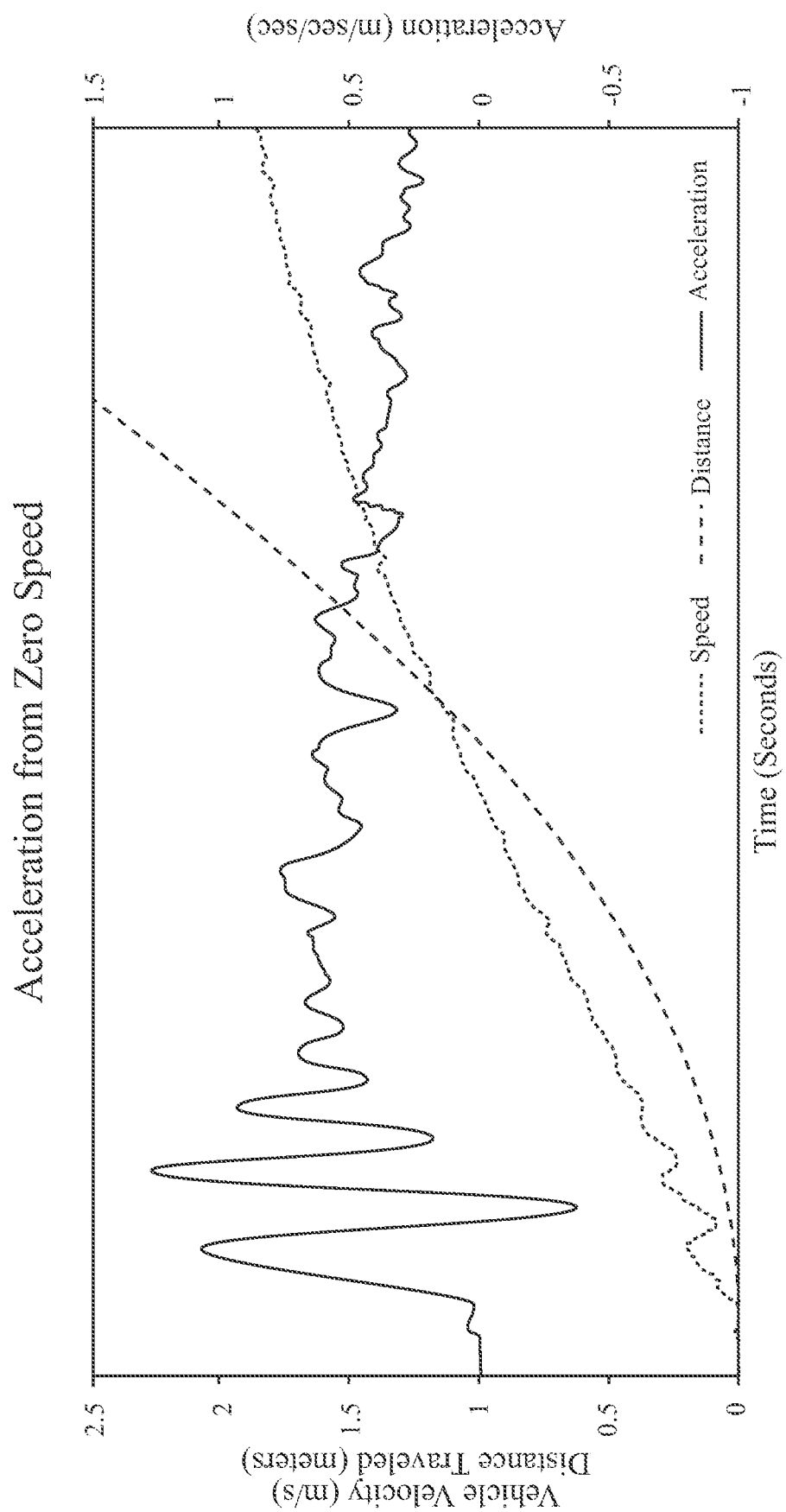
FIG. 4 is a chart depicting a relationship between vehicle speed, distance traveled and acceleration in accordance with the principles of the present invention.

Initial acceleration includes the sloppiness or the slack in the linkages or couplings 104 of one or more trailers 102 connected to and being pulled by the vehicle 10, 10' As the slack is taken up in each coupling, there may be a jerk or pull experienced as additional load is taken on by the vehicle 10, 10', which is indicated by acceleration spikes shown in the example data of FIG. 4, which data shows how vehicle speed, acceleration and distance may vary over time when the vehicle 10 or 10' accelerates from a stopped state. Therefore, it may be beneficial to delay the calculations for load until all couplings have been fully engaged.

Figure 5:
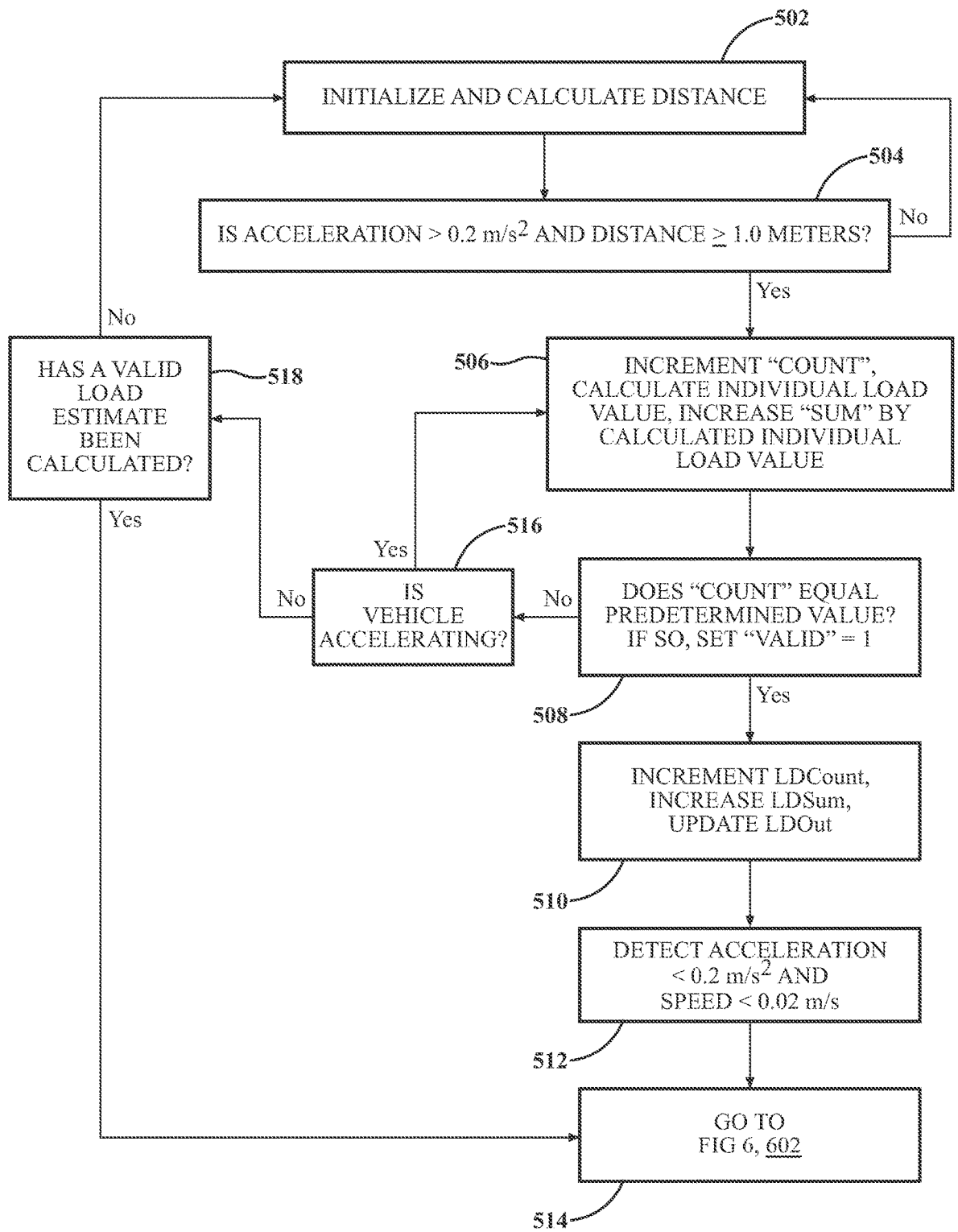
FIGS. 5 and 6 are flowcharts of an example process to calculate, or estimate, a load a vehicle is moving without directly measuring or sensing that value in accordance with the principles of the present invention.
Figure 6:
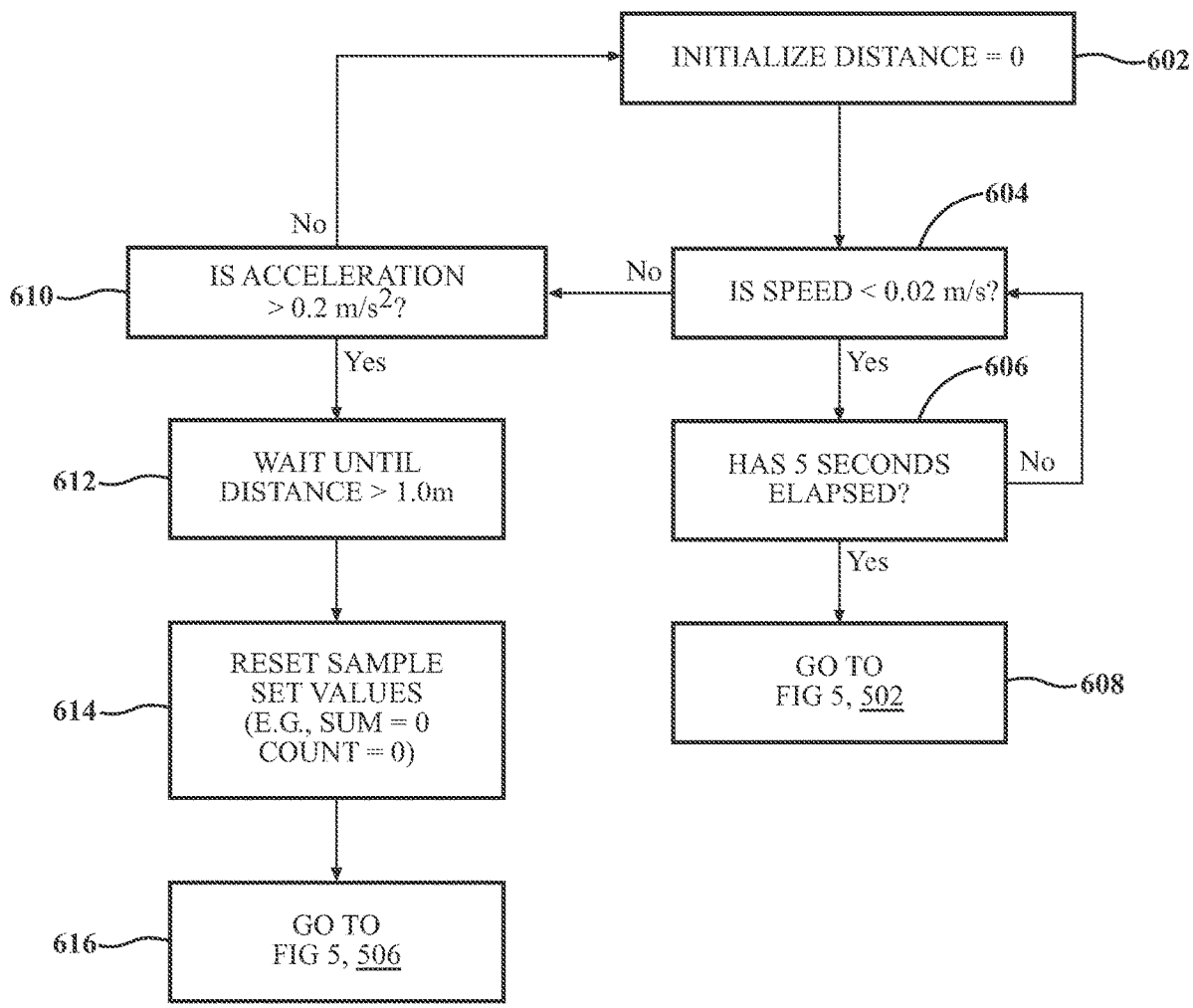

FIGS. 5 and 6 are flowcharts of an example process, in accordance with the principles of the present invention, to calculate, or estimate, a load a vehicle is moving without directly measuring or sensing that value. The process in FIGS. 5 and 6 can, for example, be implemented with executable code that is executed by the VCM 200 described earlier. A number of operating conditions of the vehicle 10 or 10' can be sensed using appropriate sensors located on components of the vehicle 10 or 10'. These sensed values can be used directly by the process or can be used to derive other values which can be used by the process.

In general, and as described more fully below, the process, under certain vehicle operating conditions, calculates an individual value for an estimate of the load the vehicle is currently moving (referred to herein as an "individual load value"). After a minimum number or predetermined maximum count number of individual load values are calculated, an average of these individual load values is considered a load estimate value for a valid set (referred to herein as a "set load value"). A number of sets of set load values are calculated and a running average of the multiple set load values of these sets is maintained. The running average value is considered by the VCM 200 to be the load currently being moved by the vehicle 10 or 10' (referred to herein as the "output load value" or "LoadOut"). The VCM 200 can then use this output load value as being the load the vehicle is presently moving when determining a maximum allowable speed of the vehicle 10 or 10'.

As mentioned above, FIG. 5 and FIG. 6 depict one example process for calculating, or estimating, a load being moved by an industrial vehicle. For an industrial vehicle that has a movable load-supporting platform (e.g., the forks carriage 54 of vehicle 10), the example process illustrated in FIG. 5 and FIG. 6 assumes that the forks of the industrial vehicle are not moving. When the industrial vehicle detects that the forks are either being raised or lowered while any of the steps of FIG. 5 and FIG. 6 are being performed, then control returns to step 502 and the calculated load of the industrial vehicle is defined to be a maximum load the industrial vehicle is designed to move, e.g., 5000 kg.

To begin, in step 502, a number of values are initialized that are used in later steps of the process. These values include a "count" which represents the number of individual load values that have been calculated in the current set; a "sum" value which represents a running sum for the individual load values that have been calculated in the current set; a "LDCount" value that represents the number of set load values that have been calculated; a "LDSum" value which represents a running sum of the load set values that have been calculated; a "Valid" value that represents whether a valid set of individual load values has been collected; a "dist" value which represents a distance the vehicle has traveled. Each of these values are initially set to "0". Another value initialized in step 502 is the "LoadOut" value which represents the output load value that the process considers to be the current load the vehicle is moving. This value is initially set to the maximum load the vehicle is designed to move, e.g., 5000 kg.

In step 502, the process also begins calculating a value for "dist" after it is initialized. In the discussion below, an example sample rate is considered to be 0.01 second and can be denoted as "dt". One of ordinary skill will easily recognize that larger or smaller sample rates can be utilized without departing from the scope of the present invention. The distance value "dist" can be calculated according to:

$$\text{dist}(n) = \text{dist}(n-1) + (\text{vehicle linear speed} \times dt) \quad \text{EQUATION 2:}$$

where "dist(n)" is the current distance value being calculated, "dist(n−1)" was the distance value previously calculated and the "vehicle linear speed" can be determined from the feedback value $\omega_3$ discussed earlier. As mentioned, the TCM 258 monitors the traction motor 264 and provides a traction feedback speed $\omega_3$, to the traction application 208 and the steering application 206. It may be beneficial in some embodiments to convert the traction speed, or speed feedback, $\omega_3$, to an actual linear speed of the vehicle 10 by the traction application 208. If, for example, the speed feedback $\omega_3$ was an angular speed of the traction motor 264, then the traction application 208 could scale that value to an actual linear speed of the vehicle 10 based on a) a gearing ratio between the traction motor 264 and the driven wheel 20 and b) the circumference of the driven wheel 20. Alternatively, if the speed feedback $\omega_3$ was an angular speed of the driven wheel 20, then the traction application 208 could scale that value to an actual linear speed of the vehicle 10 based on the circumference of the driven wheel 20. The linear speed of the vehicle equals the linear speed of the driven wheel 20, presuming there is no slip at the driven wheel.

The process continues in step 504 by determining whether the distance traveled by the vehicle is greater than a predetermined distance, also referred to herein as a "predefined distance" (e.g., 1.0 meter) and the acceleration of the vehicle is greater than a predetermined acceleration, also referred to herein as a "first predefined value" (e.g., 0.2 m/s). The predetermined distance is selected to be a distance where all of the slack in the linkages or couplings 104 of the one or more trailers 102 connected to the vehicle 10, 10' should be taken up. The predetermined acceleration is selected to be a value of sufficient magnitude representing relatively "hard" acceleration. If the distance traveled by the vehicle is not greater than the predetermined distance (e.g., 1.0 meter) and/or the acceleration of the vehicle is not greater than the predetermined acceleration (e.g., 0.2 m/s²), then the process returns to step 502 and the loop repeats by once again performing step 504. Once both conditions of step 504 are satisfied, the process advances to step 506 where an individual load value is collected or calculated. For each collected individual load value, the "count" is incremented and the "sum" is increased by the current individual load value being calculated or collected. Next, in step 508, the process checks to see if a number of individual load values that have been calculated for a current set, which equals the "count" value as discussed above, equals the minimum count number or a predetermined maximum count number or value. The value for "count" can be compared to the predetermined maximum count number (also referred to herein as the "predetermined number") such as, for example, "100." The "predetermined count number" can be any value other than 100, but preferably is greater than 1. It is further preferred that the predetermined maximum count number not exceed a value such as 200 when the sample rate is 0.01 second, more preferably not exceed 150 when the sample rate is 0.01 second and still more preferably not exceed 100 when the sample rate is 0.01 second. It is also preferred that the predetermined maximum count number and the sample rate be selected such that the count reaches the predetermined maximum count number within 2 seconds, preferably within 1.5 seconds and most preferably within 1 second from the time when the count was first incremented. This is because a more accurate "individual load value" is calculated using EQUATION 1 above when the vehicle is under a heavy acceleration such that a greater significance is placed on the (Force to Accelerate Total Vehicle and Load Mass) component in EQUATION 1 above. Hence, it is preferred that the predetermined count number be selected such that the vehicle is most likely still accelerating and has not reached a steady state travel state when the "count" value reaches the predetermined maximum count number. Once the predetermined number of individual load values is collected, i.e., the count equals the predetermined number, the value for "valid" can be set to "1" or "true", etc.

If the test of step 508 fails, then control passes to step 516 to determine if the vehicle is presently accelerating, i.e., the acceleration of the vehicle is greater than the predetermined acceleration (e.g., 0.2 m/s²). If not, then a determination is made, in step 518, if the value for "valid" is "0" or "1" (or "false" or "true", etc.). The first time through this portion of the process in FIG. 5, the value for "valid" will be "0" and so the process returns to step 502. This path represents an operating condition where the vehicle started to accelerate but did not continue long enough to collect the minimum number or predetermined maximum number of individual load values for the first set. The phrase "first time through" means that since the last time the process was initialized in step 502, the process has not successfully reached step 510 even once.

If, however, the value for "valid" in step 518 is "1", then the process advances to step 514 and proceeds to step 602 of FIG. 6. This path represents an operating condition where one or more set load values were able to be calculated previously but the vehicle stopped accelerating during the current set before the minimum number or predetermined maximum number of individual load values could be collected.

If in step 516 the vehicle is determined to be still accelerating, then the process loops back through steps 506 to 508 to collect another individual load sample, i.e., to calculate another individual load value. As mentioned above, during the first time through the process of FIG. 5, once the minimum number or predetermined maximum number of individual load values or samples is collected, the value of "valid" can be changed to "1" rather than "0" and an average of all the individual load values can be calculated from "count" and "sum" in order to calculate a current set load value, i.e., current set load value=sum divided by count. The process continues with step 510 where the "LDCount" value is incremented and the "LDSum" value is increased by the current set load value just calculated. The running average "LoadOut" value can be updated as well based on the new values for "LDCount" and "LDSum," i.e., LoadOut=LDSum divided by LDCount.

In step 512, the vehicle (e.g., the VCM 200) determines if the vehicle has stopped moving and stopped accelerating. For example, the process can determine whether the vehicle's speed is less than a second predefined value (e.g., 0.02 m/s) and the vehicle is presently not accelerating, i.e., its acceleration is less than a first predefined value (0.2 m/s$^2$). One of ordinary skill will recognize that other predefined values can be substituted, and also recognize that it would be functionally equivalent to determine that the speed is above a predefined threshold value and the vehicle is presently accelerating, in step 512 to conclude that the opposite vehicle condition is detected (e.g., the vehicle has not stopped moving and accelerating). If both of the conditions of step 512 are met, then the process advances to step 514 and proceeds to step 602 of FIG. 6. In step 512, if the process determines that the vehicle's speed is not less than the second predefined value (e.g., 0.02 m/s) and/or determines that the vehicle is presently still accelerating, i.e., its acceleration is greater than or equal to the first predefined value (0.2 m/s$^2$), then the process continues to monitor vehicle speed and acceleration and does not move to the next step 514 until it detects that the vehicle has stopped moving, i.e., both conditions of step 512 have been met. Hence, a current set load value is calculated rather quickly during initial vehicle acceleration and then no further individual load values are calculated until both conditions of step 512 are met and, as will be discussed in more detail below, the vehicle has at least traveled a distance greater than the predetermined distance (e.g., 1.0 meters) and accelerated to a value greater than the first predefined value (e.g., 0.2 m/s).

In step 602, the value "dist" is once again initialized to be "0". In step 604, the process determines if the speed of the vehicle 10, 10' remains less than the second predefined value (e.g., 0.02 m/s). If the vehicle 10, 10' remains stopped, i.e., its speed is less than the second predefined value, for more than a predetermined time period (e.g., 5 seconds), then the process returns to step 502 of FIG. 5 and all the previous calculations to estimate the load being moved by the vehicle are discarded and the process begins afresh with all values re-initialized. This path is represented by step 604 which determines if the vehicle speed remains approximately equal to "0" (e.g., below a predetermined value such as the second predefined value) and step 606 which determines that the vehicle-stopped condition has lasted at least for the predetermined time period (e.g., 5 seconds). Thus, in step 608, the process returns to step 502. If, in step 606, the process determines that the vehicle-stopped condition has lasted for less than the predetermined time period, then the process returns to step 604.

If, in step 604, the process determines that the speed of the vehicle 10, 10' is equal to or greater than the second predefined value, then the process progresses to step 610. This occurs when the vehicle slows or stops for only a brief time, less than the predetermined time period, but then its speed increases above the second predefined value. Step 610 determines that the vehicle acceleration is greater than approximately zero (e.g., greater than a predetermined value such as the first predefined value) and then, in step 612 waits until the vehicle has traveled at least a minimum distance (e.g., 1.0 meters). Under these conditions, the "sum" and "count" values are set to "0" which essentially discards the individual load values that were a part of the current set load value and starts a new set by advancing to step 616 where the process returns to step 506 of FIG. 5.

At any point in the process of FIG. 5 and FIG. 6, there is a value "LoadOut" that is available to be used by other processes (e.g., the traction application 208) to control a maximum allowable traction speed of the vehicle based on the load currently being moved by the vehicle. In this way, the speed of the vehicle is prevented from exceeding a speed that would not allow the vehicle to brake within preset guidelines or requirements. The VCM 200 may store a look up table in its memory component 202 which provides to the traction application 208 a maximum truck speed based on inputs of "LoadOut" and grade angle or percentage and sign, where a positive sign indicates the grade is an incline and a negative sign indicates the grade is a decline in the direction of movement.

As mentioned above, in step 506 of FIG. 5, an individual load value is calculated. One possible method of doing so in accordance with the principles of the present invention is described below.

As described above, a current linear speed of the vehicle, $v_3$ or $VS_M$ (m/s), can be sensed or calculated by the VCM using the angular speed $\omega_3$ of the traction motor 264. This value can be used to help detect when the vehicle speed is essentially zero and also for deriving a linear acceleration of the vehicle, $VA_M$ (m/s$^2$). The linear acceleration of the vehicle may also be derived using the angular speed of the traction motor 264, as discussed above. In addition to the vehicle acceleration being measured/calculated by VCM 200 as derived from samples of $VS_M$ or using the angular speed of the traction motor 264, the vehicle acceleration can, alternatively, be measured directly with a separate accelerometer.

Within the TCM 258 or the traction motor 264, sensors can be present that monitor the speed of various components. For example, the rotational speed of the electric motor shaft, $MS_M$ (RPM), can be measured by an appropriately placed sensor. This motor speed can be converted by the processor 216 within the VCM 200 into a value representing the motor speed in rad/s, $MS_R$ (rads/s), according to the formula:

$$MS_R(\text{rads/s})=MS_M\times(2\pi\text{rads/rotation})\times(1\text{ minute}/60\text{ seconds}).$$

The processor 216 within the VCM 200 can sample the current value for $MS_R$ at a preset sample rate (e.g., dt=0.01 s), which allows the change, $\Delta MS_R$ (rads/s), in electric motor rotational speed that occurred between the two most recent sampled values of $MS_R$ to be calculated according to:

$$\Delta MS_R(\text{rads/s})=MS_R[n]-MS_R[n-1]$$

and the angular acceleration of the motor shaft of the traction motor 264 during a sample period to be calculated according to:

$$MA(\text{rads/s}^2):=\Delta MS_R/dt.$$

As mentioned above, there is a predetermined constant value, a rotational inertia RI (kg m$^2$), e.g., 0.0153 kgm$^2$, which is the rotational inertia of the rotational components in the drive train of the vehicle, such as the motor rotor, gears and the driven wheel 20. Thus, an inertial torque, $T_{IT}$ (N m), which is the inertial torque needed to accelerate the RI can be calculated according to:

$$T_{IT}(N\ m) = MA \times RI.$$

The VCM 200 calculates a torque command, $T_C$, equal to the traction torque setpoint $\tau_1$, that is provided to the TCM 258 for controlling the operation of the traction motor 264 and is intended to be representative of the total torque currently being provided by the shaft of the traction motor. However, because of the presence of the inertial torque, $T_{IT}$, the effective torque, $T_E$, provided by the traction motor 264 to the drivetrain, is calculated by subtracting the inertial torque, $T_{IT}$, from the torque command, $T_C$, as follows:

$$T_E = T_C - T_{IT}.$$

The electric traction motor 264 can be mechanically coupled with the driven wheel 20 by one or more gears and one or more shafts. Thus, the torque applied to the driven wheel 20 is based on $T_E$ but is also dependent on the gearbox ratio and the gearbox efficiency of the gears between the electric traction motor 264 and the driven wheel 20. An example gearbox ratio may be 15.6 and an example gearbox efficiency may be 0.95, both constants. Thus, the torque applied to the driven wheel 20, $T_T$ (N m), can be calculated or determined according to:

$$T_T(N\ m) = T_E \times (\text{gearbox ratio}) \times (\text{gearbox efficiency}).$$

Assuming, that the driven wheel shaft passes through the center of the driven or traction wheel 20, the moment arm associated with the torque $T_T$ would be the radius of the driven or traction wheel 20. Accordingly, a force acting on the vehicle 10, 10' equivalent to torque $T_T$ can be calculated; in this case an equivalent linear force can be calculated according to:

$$F_A(N) = T_T / (\text{driven wheel radius in meters}).$$

As mentioned above, the acceleration of the vehicle is also affected by rolling resistance and the grade of the surface over which the vehicle is traveling. The rolling resistance value, R % (no units/100), is considered to be a predetermined constant value, but can be different for different vehicles and different surfaces. The grade, G % (no units/100) has a positive or negative sign and can be detected by a sensor of the vehicle such as an accelerometer and/or gyroscope.

If the grade of the surface is uphill in the direction of travel of the vehicle 10, 10', then the sign of G % is positive. If the grade of the surface is downhill in the direction of travel of the vehicle 10, 10', then the sign of G % is negative.

Thus, the equivalent force $F_A$ can be divided into three components to achieve three different tasks:

$$F_A = (F_T\text{:force to accelerate total vehicle mass}(TVM) + F_G\text{:force to climb/descend grade} + F_R\text{:force to overcome rolling resistance})$$

where:
TVM (kg) is the combined mass of the load(s), any trailer(s), and the vehicle,
$F_T(N) = (TVM \times VA_M)$,
$F_G(N) = (TVM \times G\% \times 9.8\ m/s^2)$, and
$F_R(N) = (TVM \times R\% \times 9.8\ m/s^2)$,
which results in EQUATION 4:

$$F_A = (TVM \times VA_M) + (TVM \times G\% \times 9.8\ m/s^2) + (TVM \times R\% \times 9.8\ m/s^2).$$

EQUATION 4 can be manipulated by dividing both sides by 9.8 m/s² to solve for TVM (kg):

$$TVM(kg) = \frac{\frac{F_A}{9.8}}{VA_g + G\% + R\%}$$

where $VA_g$ (no units) is the vehicle acceleration in g's and is equal to $VA_M/(9.8\ m/s^2)$.

Thus, the load being moved by the vehicle, which the process of FIG. 5 and FIG. 6 calculates as an individual load value in step 506 (which can be an estimate of the weight of the trailer(s) plus cargo on or in the trailer or the weight of a load (cargo) on the forks) is determined according to:

$$\text{Load(kg)} = TVM - (\text{empty vehicle weight in kg})$$

where the empty vehicle weight is a known empty weight value for a vehicle.

In the above-described example process for estimating the load a vehicle 10, 10' is moving, the torque applied to the driven wheel 20 was converted into an equivalent linear force applied by the wheel 20 to the floor. Such a conversion is not required and, as described in detail below, each of the individual load values can be calculated based on torque values. As mentioned, the torque command $T_C$ results in an effective amount of torque, $T_E$, being applied at the shaft of the electric motor and an inertial torque, $T_{IT}$, being applied to overcome the rotational inertial RI, so that $T_C = T_E + T_{IT}$. Which can be re-arranged to give the equation for the effective torque:

$$T_E = T_C - T_{IT}$$

As noted above, the torque applied to the driven wheel 20 is based on $T_E$ but is also dependent on the gearbox ratio and the gearbox efficiency of the gears between the electric traction motor 264 and the driven wheel 20. An example gearbox ratio may be 15.6 and an example gearbox efficiency may be 0.95, both constants. Thus, the torque applied to the driven wheel 20, $T_T$ (N m), can be calculated according to:

$$T_T = T_E \times (\text{gearbox ratio}) \times (\text{gearbox efficiency})$$

where $T_T$ is the torque applied to the driven wheel 20.

Using the above two equations allows $T_T$ to be calculated according to:

$$T_T = (T_C - T_{IT}) \times (\text{gearbox ratio}) \times (\text{gearbox efficiency}).$$

Assuming, that the driven wheel shaft passes through the center of the driven wheel, the moment arm associated with the torque $T_T$ would be the radius of the driven wheel. As described above, a formula for a force, $F_A$, acting on the vehicle equivalent to torque $T_T$ can be determined; in this case the formula for the equivalent linear force would be:

$$F_A = T_T / (\text{driven wheel radius in meters}).$$

Combining the above two equations allows the formula for the force $F_A$ to be rewritten as:

$$F_A = \frac{(T_C - T_{IT}) \times \text{gearbox ratio} \times \text{gearbox efficiency}}{\text{driven wheel radius}}$$

As mentioned above, the acceleration of the vehicle is also affected by rolling resistance and the grade of the surface over which the vehicle is traveling. The rolling resistance value, R % (no units/100), is considered to be a predetermined constant value, but can be different for different vehicles and different surfaces. Thus, the equivalent force $F_A$ can be divided into three components to achieve three different tasks:

$$F_A = (F_T\text{:force to accelerate total vehicle mass}(TVM) + F_G\text{:force to climb/descend grade} + F_R\text{:force to overcome rolling resistance})$$

where:
TVM (kg) is the combined mass of the load(s), any trailer(s), and the vehicle,
$F_T$ (N)=(TVM×VA$_M$),
$F_G$ (N)=(TVM×G %×9.8 m/s$^2$), and
$F_R$ (N)=(TVM×R %×9.8 m/s$^2$).
Thus, just as above with EQUATION 4:

$$F_A = (TVM \times VA_M) + (TVM \times G\% \times 9.8 \text{ m/s}^2) + (TVM \times R\% \times 9.8 \text{ m/s}^2).$$

Rearranging elements in the above equation provides:

$$TVM = \frac{F_A}{VA_M + (G\% \times 9.8) + (R\% \times 9.8)}$$

Just like in the earlier example embodiment, dividing both the numerator and denominator of the right-hand side by 9.8 provides:

$$TVM = \frac{\frac{F_A}{9.8}}{VA_g + G\% + R\%}.$$

where $VA_g$ (no units) is the vehicle acceleration in g's and is equal to $VA_M/(9.8 \text{ m/s}^2)$. Substituting the above-identified formula for the equivalent force $F_A$ into the immediately-above equation allows TVM to be calculated according to:

$$TVM = \frac{\left(\frac{(T_C - T_{IT}) \times \text{gearbox ratio} \times \text{gearbox efficiency}}{(9.8 \times \text{driven wheel radius})}\right)}{VA_g + G\% + R\%}.$$

Thus, the load being moved by the vehicle, which the process of FIG. 5 and FIG. 6 calculates as an individual load value in step 506 (which can be an estimate of the weight of the trailer(s) plus cargo on or in the trailer or the weight of a load (cargo) on the forks) is determined according to:

Load(kg)=TVM−(empty vehicle weight in kg)

where the empty vehicle weight is a known value for a vehicle.

A system and a processor-implemented method have been described above, for controlling a maximum vehicle speed for an industrial vehicle, that include determining a torque applied to a traction wheel of the industrial vehicle; determining an acceleration of the industrial vehicle while the torque is applied to the traction wheel; based at least in part on the acceleration and the torque, calculating a load being moved by the industrial vehicle; and controlling the maximum speed of the industrial vehicle based on the calculated load being moved by the industrial vehicle. In some instances, the torque may be converted to an equivalent force value wherein the calculated load value is calculated based at least in part on the equivalent force value.

As one example, the load may be one or more trailers, empty or not, being pulled by the industrial vehicle. As another example, the industrial vehicle can have a fork assembly, or some other type of lift platform, for carrying the load.

When the industrial vehicle first starts, there may a period of time before operating conditions allow for calculation of the load being moved. As a result, in the above-described systems and methods, an initial value for the calculated load can be set to be the maximum load the industrial vehicle is designed to move.

As shown in FIG. 4, the acceleration of the industrial vehicle from a stopped state fluctuates greatly during the first few seconds after traveling begins. Thus, it may be beneficial to wait until the industrial vehicle has traveled a minimum, predetermined distance before calculating the load being moved by the industrial vehicle. Accordingly, the above-described systems and methods can include determining whether the industrial vehicle has traveled more than a predetermined distance when starting to travel after previously being stopped, wherein calculating the load being moved by the industrial vehicle is delayed until the industrial vehicle is determined to have traveled more than the predetermined distance.

However, in EQUATION 1, the term that represents the force to accelerate the total vehicle and load mass is larger when the industrial vehicle is accelerating the most and is smaller as the industrial vehicle approaches a steady state speed. Furthermore, until a load value is estimated, the example process described above uses the maximum load the vehicle 10, 10' is designed to move as the estimated, or calculated, load. As mentioned above, a maximum speed limit for the vehicle 10, 10' can be imposed based on this calculated load. Thus, it is beneficial to calculate an initial load value using the above-described process before the vehicle 10, 10' is able to reach a speed equal to the maximum speed limit that corresponds with a load equal to the maximum load the vehicle 10, 10' is designed to move. For example, if the initial calculated load is less than the maximum load the vehicle 10, 10' is designed to move and the maximum speed limit for the initial calculated load (hereinafter the first maximum speed limit) is greater than the maximum speed limit (hereinafter the second maximum speed limit) for a load equal to the maximum load the vehicle 10, 10' is designed to move, then by calculating the initial calculated load prior to the vehicle reaching a speed equal to the second maximum speed limit, a situation where the vehicle slows down to the second maximum speed limit and then is allowed to increase its speed up to the first maximum speed limit is avoided.

For an industrial vehicle, its ability to successfully brake within predetermined guidelines is affected by the industrial vehicle's weight, the load it is moving, the grade angle and the industrial vehicle's speed. Thus, the above-described systems and methods can include determining a maximum speed limit using, for example, a look up table or equation based on the calculated load being moved by the industrial vehicle or the calculated load and grade; and limiting the maximum speed of the industrial vehicle based on the determined maximum speed limit. For example, the VCM 200 may store a look up table including, for example, the data of FIG. 3A, in its memory component 202 and use that look up table to determine and then provide to the traction application 208 a maximum truck speed limit based on inputs of "LoadOut" and grade angle or percentage and sign, where a positive sign indicates the grade is an incline and a negative sign indicates the grade is a decline in the direction of movement. In the illustrated embodiment, for all positive inclines, the grade % is considered to equal 0% in FIG. 3.

For all grades that are declines, the corresponding grade % provided in FIG. 3A is used. However, it is contemplated that a separate look up table or equation could be provided for positive inclines.

Other forces also affect the ability of the industrial vehicle to accelerate. One example of such a force is the rolling resistance. Also, the force resulting from the grade over which the vehicle is traversing is another example of such a force. Thus, the above-described systems and methods can include a) determining a rolling resistance of the industrial vehicle while moving the load, wherein calculating the load being moved by the industrial vehicle is based at least in part on the rolling resistance; and/or b) determining a grade of a path being traveled by the industrial vehicle while moving the load, wherein calculating the load being moved by the industrial vehicle is based at least in part on the grade.

Rather than calculating a single estimate for the load being moved by the industrial vehicle, multiple individual load values can be calculated and then averaged together as one way to improve the accuracy of the calculated load. Thus, there can be a set of individual load values such that their average is considered to be the set load value. Additionally, a set can be defined to include at least a minimum number or a predetermined maximum number of individual load values before being considered to be a valid set. Thus, the above-described systems and methods can include calculating a set comprising the predetermined number of individual load values of the load being moved by the industrial vehicle; and averaging the predetermined number of individual load values to determine a respective set load value for the set.

In addition to a set having a predetermined number of individual load values, the collecting of the individual load values can be limited to certain operating conditions of the industrial vehicle. As one example, described earlier, calculating the load can be delayed until the industrial vehicle has traveled at least some minimum distance. Another constraint may be to calculate the load only if the industrial vehicle's acceleration is above a first predefined value. Thus, the above-described systems and methods can include calculating a set comprising a predetermined number of individual load values of the load being moved by the industrial vehicle in response to the industrial vehicle accelerating above a first predefined value and traveling at least a predetermined distance; and averaging the predetermined number of individual values to determine a respective set load value for the set.

The estimate for the calculated load can be further refined by averaging a number of set load values. Thus, the above-described systems and methods can include collecting a plurality of the sets of individual load values of the load being moved by the vehicle; and averaging the respective values of the plurality of sets to determine the calculated load.

Because raising and lowering a lift mechanism (e.g., forks) of the industrial vehicle may indicate a change in the load being moved, the calculating of the load, in the manner described above, can be discontinued when movement of the lift mechanism is detected. Further still, there may be a period of time before calculation of the load, in the manner described above, can be resumed; so, when movement of the lift mechanism is detected, the value for the calculated load can be set to equal the maximum load the industrial vehicle is designed to move. Thus, the above-described systems and methods can include determining when a lift mechanism of the industrial vehicle is being raised or lowered, wherein calculating the load being moved by the industrial vehicle based on the acceleration and the torque is not performed while the lift mechanism is being raised or lowered. Also, the above-described systems and methods can include defining the calculated load to be the maximum load the industrial vehicle is designed to move, in response to determining the lift mechanism of the industrial vehicle is being raised or lowered.

The control inputs by an operator of the industrial vehicle may not always be smooth and precise. As such, there can be instances in which the industrial vehicle may briefly stop accelerating, briefly slow down, or even briefly stop although the operator's intent is to keep accelerating. In other instances, the operator's intent may be to stop the vehicle, which could allow for a change to the load being moved. Accordingly, determining which operating conditions correspond with a vehicle briefly slowing and which operating conditions correspond to a vehicle being stopped can be useful when calculating the load being moved by the vehicle.

As such, the above-described systems and methods can include collecting sets of individual load values and then detecting occurrence of a first operating condition and then occurrence of a subsequent, second operating condition. The first operating condition comprises: a) an acceleration of the industrial vehicle is less than a first predefined value, and b) a speed of the industrial vehicle is less than a second predefined value. The subsequent second operating condition comprises the industrial vehicle, within a predefined time period after the first operating condition, a) begins accelerating again above the first predefined value, and b) has traveled a predetermined distance. These operating conditions likely correspond to an industrial vehicle that only briefly slowed down. Thus, in response to occurrence of the first operating condition and occurrence of the second operating condition, the above-described systems and methods can include collecting a further set of individual load values of the load being moved by the industrial vehicle; and averaging the respective values of the plurality of sets to calculate the calculated load.

Also, the above-described systems and methods can include collecting sets of individual load values and then detecting occurrence of a first operating condition and then occurrence of a subsequent, third operating condition. The first operating condition comprises: a) an acceleration of the industrial vehicle is less than a first predefined value, and b) a speed of the industrial vehicle is less than a second predefined value. The subsequent third operating condition comprises the speed of the industrial vehicle, within a predefined time period after the first operating condition, does not reach or exceed the second predefined value. These operating conditions likely correspond to an industrial vehicle that has been stopped. Thus, in response to occurrence of the first operating condition and occurrence of the third operating condition, the above-described systems and methods can include defining the calculated load to be the maximum load the industrial vehicle is designed to move.

The above-described systems and methods can include a particular way to calculate, or estimate, each of the individual load values discussed above. In particular the individual load values of the load being moved by the industrial vehicle is calculated according to one of at least two different equations:

$$\text{Total Vehicle Mass } (TVM) = \frac{\frac{F_A}{9.8}}{VA_g + G\% + R\%}$$

-continued or $$TVM = \frac{\left(\frac{(T_C - T_{IT}) \times \text{gearbox ratio} \times \text{gearbox efficiency}}{(9.8 \times \text{driven wheel radius})}\right)}{VA_g + G\% + R\%}.$$

where $F_A$ is the equivalent force value of a torque applied to the traction wheel 20; $T_C$ is a torque command; $T_{IT}$ is an inertial torque; R % is a rolling resistance value; G % is a present grade as a percentage of a surface on which the industrial vehicle is traveling; $VA_g$ is the acceleration of the industrial vehicle in g's; and the individual load value=TVM−(an empty weight of the industrial vehicle).

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for controlling a maximum vehicle speed for an industrial vehicle, comprising:

determining, by a processor of the industrial vehicle, a torque applied to a traction wheel of the industrial vehicle;

determining, by the processor of the industrial vehicle, an acceleration of the industrial vehicle while the torque is applied to the traction wheel;

based at least in part on the acceleration and the torque applied to the traction wheel, calculating, by the processor of the industrial vehicle, a load being moved by the industrial vehicle; and controlling, by the processor of the industrial vehicle, the maximum speed of the industrial vehicle based on the calculated load being moved by the industrial vehicle, wherein calculating the load comprises:

calculating a set comprising a predetermined number of individual load values of the load being moved by the industrial vehicle in response to the industrial vehicle accelerating above a first predefined value and traveling at least a predetermined distance; and averaging the predetermined number of individual values to determine a respective set load value for the set;

wherein no further individual load values are calculated after the respective set load value for the set is determined until at least one of the following vehicle conditions is met:

a) an acceleration of the industrial vehicle is less than the first predefined value, or b) a speed of the industrial vehicle is less than a second predefined value.

2. The method as set out in claim 1, wherein no further individual load values are calculated until at least both of the vehicle conditions are met.

* * * * *

UNITED STATES PATENT AND TRADEMARK OFFICE
CERTIFICATE OF CORRECTION

PATENT NO. : 11,945,705 B2
APPLICATION NO. : 17/456231
DATED : April 2, 2024
INVENTOR(S) : Joe K. Hammer et al.

It is certified that error appears in the above-identified patent and that said Letters Patent is hereby corrected as shown below:

In the Specification

Column 9, Line 46, "on. The steering setpoint on" should read -- $\omega_1$. The steering setpoint $\omega_1$ --
Column 9, Line 48, "setpoint on" should read -- setpoint $\omega_1$ --
Column 10, Line 40, "Ti is output" should read -- $\tau_1$ is output --
Column 20, Line 4, "may a period" should read -- may be a period --

Signed and Sealed this
Thirteenth Day of August, 2024

Katherine Kelly Vidal
*Director of the United States Patent and Trademark Office*